US012749917B2

(12) United States Patent
Cui et al.

(10) Patent No.: US 12,749,917 B2
(45) Date of Patent: Sep. 29, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Shengjiang Cui, Dongguan (CN); Chuanfeng He, Dongguan (CN); Rongyi Hu, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 290 days.

(21) Appl. No.: 18/394,843

(22) Filed: Dec. 22, 2023

(65) Prior Publication Data

US 2024/0128794 A1 Apr. 18, 2024

Related U.S. Application Data

(63) Continuation of application No. PCT/CN2021/104019, filed on Jul. 1, 2021.

(51) Int. Cl.
*H02J 50/00* (2016.01)
*H04W 52/02* (2009.01)

(52) U.S. Cl.
CPC ....... *H02J 50/001* (2020.01); *H04W 52/0216* (2013.01); *H04W 52/0235* (2013.01)

(58) Field of Classification Search
CPC ............. H02J 50/001; H04W 52/0216; H04W 52/0235
See application file for complete search history.

(56) References Cited

U.S. PATENT DOCUMENTS

2010/0142423 A1* 6/2010 Zhu .......................... H02J 50/80 370/311
2014/0036877 A1* 2/2014 Campbell ............. H04W 72/56 370/336
2015/0030011 A1* 1/2015 Liu ........................ H04L 1/1893 370/336
2018/0331966 A1* 11/2018 Lee .......................... H04L 67/04
(Continued)

FOREIGN PATENT DOCUMENTS

CN 102246389 A 11/2011
CN 103733237 A 4/2014
CN 105186617 A 12/2015
(Continued)

OTHER PUBLICATIONS

Van Huynh Nguyen et al: “Ambient Backscatter Communications: a Contemporary Survey”, dated Nov. 19, 2018 (34 pages).
(Continued)

*Primary Examiner* — Nathan A Mitchell
(74) *Attorney, Agent, or Firm* — Ladas & Parry LLP

(57) ABSTRACT

A wireless communication method and a terminal device are provided. The wireless communication method includes: receiving, by a terminal device, a first signal for power harvesting; and monitoring, by the terminal device, a second signal, the second signal being configured to schedule or trigger the terminal device for data transmission, and the second signal being transmitted at multiple transmission occasions.

20 Claims, 8 Drawing Sheets

100

(56) References Cited

U.S. PATENT DOCUMENTS

| | | | | |
|---|---|---|---|---|
| 2023/0021119 | A1* | 1/2023 | Lakshminarayan | H04W 88/06 |
| 2024/0276533 | A1* | 8/2024 | Lakshminarayan | H04W 72/0446 |

FOREIGN PATENT DOCUMENTS

| | | | |
|---|---|---|---|
| CN | 105359167 | A | 2/2016 |
| CN | 107360632 | A | 11/2017 |
| CN | 107787560 | A | 3/2018 |
| CN | 108809564 | A | 11/2018 |
| CN | 108964751 | A | 12/2018 |
| CN | 111696333 | A | 9/2020 |
| WO | 2018040043 | A1 | 3/2018 |
| WO | 2019178824 | A1 | 9/2019 |

OTHER PUBLICATIONS

European Search Report, European Patent Application No. 21947635.5, mailed Jul. 24, 2024 (12 pages).

EPC™ Radio-Frequency Identity Protocols Generation-2 UHF RFID Standard Release 2.1 ; RFID standard ; 2018.7.

International Search Report and Written Opinion, International Application No. PCT/CN2021/104019, mailed Oct. 25, 2021 (19 pages).

* cited by examiner

WIRELESS COMMUNICATION METHOD AND TERMINAL DEVICE

CROSS REFERENCE TO RELATED APPLICATIONS

The present disclosure is a continuation of International Patent Application No. PCT/CN2021/104019, filed Jul. 1, 2021, the contents of which is herein incorporated by reference in its entirety.

TECHNICAL FIELD

The present disclosure relates to the field of communication, in particular to a wireless communication method and a terminal device.

BACKGROUND

In the current communication network, terminals are active. An active terminal can monitor scheduling information of a correspondent node and transmit data based on the scheduling information. With the increase of applications in the communication field, there are more and more terminal types in the communication field. For example, many communication industries have high requirements on power consumption of a terminal device at present, such as the application of a passive terminal without battery or a semi passive terminal becoming a key technology in many communication industries.

For the above passive terminals, even some semi passive terminals or active terminals, in some cases, they may not be able to use battery to supply power, but are required to implement data transmission in back scattering. For such terminals, they are required to harvest power before communication, and then communicate. For the above correspondent node, it is impossible to know when such terminals can harvest enough power for communication. Thus, the correspondent node cannot know when such terminals can receive the scheduling information. Based on this, how to transmit the scheduling information is a technical problem to be solved in the present disclosure.

SUMMARY

On a first aspect, a wireless communication method is provided and includes: receiving, by a terminal device, a first signal for power harvesting; and monitoring, by the terminal device, a second signal, the second signal being configured to schedule or trigger the terminal device for data transmission, and the second signal being transmitted at multiple transmission occasions.

On a second aspect, a wireless communication method is provided and includes: transmitting, by a communication device, a second signal on multiple transmission occasions, the second signal being configured to schedule or trigger a terminal device to perform data transmission.

On a third aspect, a terminal device is provided and includes a processor and a memory. The memory is configured to store a computer program, and the processor is configured to call and run the computer program stored in the memory and perform the method in the first aspect or methods performed by the first aspect.

DETAILED DESCRIPTION

Figure 1:
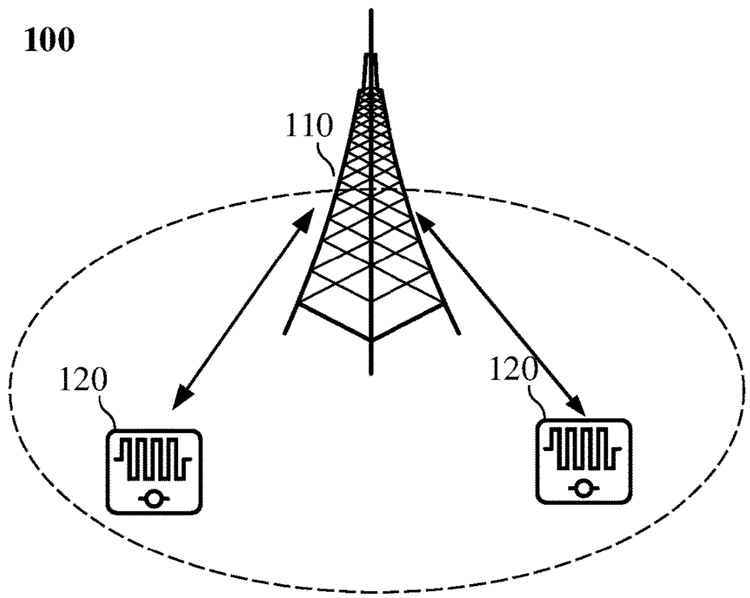
FIG. 1 is a schematic diagram of a communication system according to some embodiments of the present disclosure.

The technical solutions in embodiments of the present disclosure are described in conjunction with the drawings in the embodiments of the present disclosure. It is obvious that the described embodiments are only a part of embodiments of the present disclosure, and not all embodiments. All other embodiments acquired by those skilled in the art based on the embodiments in the present disclosure without the creative work are all within the scope of the present disclosure.

It should be understood that terms “system” and “network” herein may be used interchangeably herein. Term “and/or” in the present disclosure is only an association relationship describing the associated objects, which means that there can be three kinds of relationships; for example, A and/or B can mean three situations including: A exists alone, A and B exist simultaneously, and B exists alone. In addition, the character “/” in the present disclosure generally indicates that associated objects before and after this character are in an “or” relationship.

In the description of some embodiments of the present disclosure, the terms “corresponding” or “correspond” may mean that there is a direct or indirect corresponding relationship between the two, or that there is an association between the two, or that there is a relationship between indicating and being indicated, or configuring and being configured.

The embodiments of the present disclosure may be applied to various communication systems, such as: a global system of mobile communication (GSM) system, a code division multiple Access (CDMA) system, a broadband code division multiple access (WCDMA) system, a general packet radio service (GPRS), a long term evolution (LTE) system, an advanced long term evolution (LTE-A) system, a new radio (NR) system, an evolution system of NR system, a LTE based access to unlicensed spectrum (LTE-U) system, a universal mobile communication system (UMTS), a wireless local area networks (WLAN), a wireless fidelity (WiFi), a next-generation communication system, a zero power consumption communication system, a cellular Internet of Things, a cellular passive Internet of Things, or other communication systems.

The cellular Internet of Things is a developed product combining a cellular mobile communication network with an Internet of Things. The cellular passive Internet of Things is also called a passive cellular Internet of Things, which is a combination of a network device and a passive terminal. In the cellular passive Internet of Things, the passive terminal may communicate with other passive terminals through the network device, or the passive terminal may communicate through device to device (D2D) communication. The network device only needs to transmit a carrier signal, i.e., the power supply signal, to supply power to the passive terminal.

Traditional communication systems support a limited number of connections and are easy to implement. However, with the development of communication technologies, the mobile communication system will not only support the traditional communication, but also support, for example, D2D communication, machine to machine (M2M) communication, machine type communication (MTC), and vehicle to vehicle (V2V) communication, etc. The embodiments of the present disclosure may also be applied to these communication systems.

In some embodiments, the communication system may be applied to a carrier aggregation (CA) scenario, a dual connectivity (DC) scenario, and a standalone (SA) networking scenario.

The embodiment of the present disclosure does not limit an applied spectrum. For example, the embodiment of the present disclosure may be applied to a licensed spectrum, and may also be applied to an unlicensed spectrum.

Exemplary, a communication system 100 applied in some embodiments of the present application is shown in FIG. 1. The communication system 100 may include a network device 110 communicating with a terminal device 120 (or called a communication terminal, a terminal). The network device 110 may provide communication coverage for a particular geographical region, and may communicate with terminal devices located in the coverage region.

FIG. 1 shows one network device and two terminal devices in an exemplary manner. In some embodiments, the communication system 100 may include multiple network devices and a coverage of each network device may include other number of terminal devices, which is not limited.

In some embodiments, the communication system 100 may also include a network controller, mobile management entity and other network entities, which is not limited.

It should be understood that the device with communication function in the network/system in some embodiment of the present disclosure may be called a communication device. The communication system 100 shown in FIG. 1 is taken as an example, the communication device may include a network device 110 and a terminal device 120 with communication function, and the network device 110 and terminal device 120 may be the specific device described above, which is not repeated here. The communication device may also include other device in the communication system 100, such as a network controller, a mobile management entity and other network entities, which is not limited.

Some embodiments of the present disclosure are described in combination with a terminal device and a network device. The network device may be a device configured to communicate with a mobile device, and the network device may be an access point (AP) in a WLAN, a base transceiver station (BTS) in a GSM or a CDMA, a NodeB (NB) in a WCDMA, an evolutional node B (eNB or eNodeB) in a LTE, a relay station, an access point, or a gNB in an on-board device a wearable device, or a NR network, or a network device in a PLMN network that will evolve in the future.

In some embodiments of the present disclosure, the network device provides services for a cell, and the terminal device communicates with the network device through transmission resources (for example, frequency domain resources, or spectrum resources) used by the cell. The cell may be a cell (for example, a base station) corresponding to the network device, and the cell may belong to a macro base station or a base station corresponding to a small cell. The small cell may include: a metro cell, a micro cell, a pico cell, and a femto cell, etc. These small cells have the characteristics of small coverage and low transmission power, and are suitable for providing high-speed data transmission services.

In some embodiments of the present disclosure, the terminal device may also be called a user device (UE), an access terminal, a user unit, a user station, a mobile station, a remote station, a remote terminal, a mobile device, a user terminal, a terminal, a wireless communication device, a user agent or a user apparatus. The terminal device may be a station (ST) in WLAN, a cellular phone, a cordless phone, a session initiation protocol (SIP) phone, a wireless local loop (WLL) station, a personal digital assistant (PDA) device, a handheld device with wireless communication functions, a computing device, or other processing device connected to a wireless modem, a board devices, a wearable devices, a next-generation communication system such as a terminal device in NR network, a terminal device in the future evolution of public land mobile network (PLMN) network, or a device with zero power consumption, etc.

As an example without limitation, in embodiments of the present disclosure, the terminal device may also be a wearable device. The wearable device may also be called a wearable smart device, which is a general name of wearable devices applying wearable technology to intelligently design daily wear, such as a glass, a glove, a watch, clothing and a shoe, etc. The wearable device is a portable device that is directly worn on the body or integrated into the user's clothes or accessories. The wearable devices are not only a hardware device, but also has powerful functions through software support, data interaction and cloud interaction. The generalized wearable smart device has full functions, large size, complete or partial functions that may be implemented without relying on smart phones, the generalized wearable smart device may be a smart watch or a smart glass, etc. The generalized wearable smart device may only focus on certain application functions, and needs to be used together with other devices such as a smart phone, various smart bracelets and smart jewelry for sign monitoring.

It should be understood that the device with zero power consumption may be understood as a device whose power consumption is lower than a preset power consumption, such as a passive terminal, and even a semi passive terminal. In recent years, the devices with zero power consumption are applied more and more extensively. A typical device with zero power consumption is a device adopted a Radio Frequency Identification (RFID), which is a technology that uses spatial coupling of radio frequency signals to implement an automatic transmission and identification of non-contact tag information. A RFID tag is also called "radio frequency tag" or "electronic tag". According to different power supply modes, types of electronic tags may be divided into an active electronic tag, a passive electronic tag, and a semi passive electronic tag. The active electronic tag is a tag that working power of the electronic tag is provided by a battery. The battery, a memory, and an antenna together form the active electronic tag. Different from a passive RF activation mode, the active electronic tag transmits information through a set frequency band before the battery is replaced. The passive electronic tag does not support a built-in battery. When the passive electronic tag approaches a reader/writer, the tag is in a near-field range formed by a radiation of a reader/writer antenna, an electronic tag antenna generates induced current through electromagnetic induction, and the induced current drives a chip circuit of the electronic tag. The chip circuit transmits identification information stored in the tag to the reader/writer through the electronic tag antenna. The semi passive electronic tag includes advantages of the passive electronic tag, such as small size, light weight, low price and long service life. A built-in battery only provides power for a few circuits in a chip when there is no reader/writer to access. Only when a reader/writer accesses, the built-in battery supplies power to a RFID chip to increase a distance of reading and writing of the tag and improve a reliability of communication.

It should be understood that the passive electronic tag is generally understood as a device with zero power consumption, and in some cases, the semi passive electronic tag is also understood as a device with zero power consumption.

Figure 2:
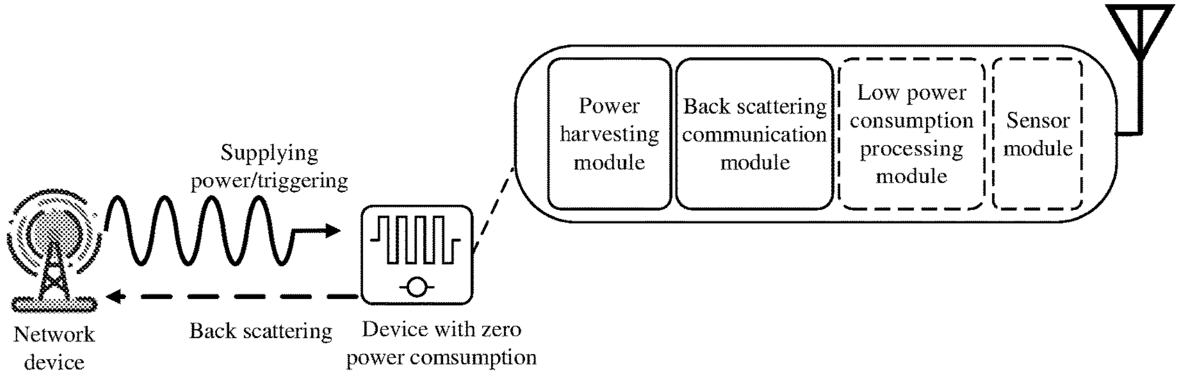
FIG. 2 is a schematic diagram of a communication system with zero power consumption according to some embodiments of the present disclosure.

FIG. 2 is a schematic diagram of a communication system with zero power consumption according to some embodiments of the present disclosure. As shown in FIG. 2, a device with zero power consumption receives a radio frequency signal transmitted by a network device after the device enters an electromagnetic field, and the device uses power harvested through the electromagnetic field generated in space to transmit data.

Communication based on the device with zero power consumption, referred to as zero power consumption communication, includes the following key technologies.

1. Back Scattering

Figure 3:
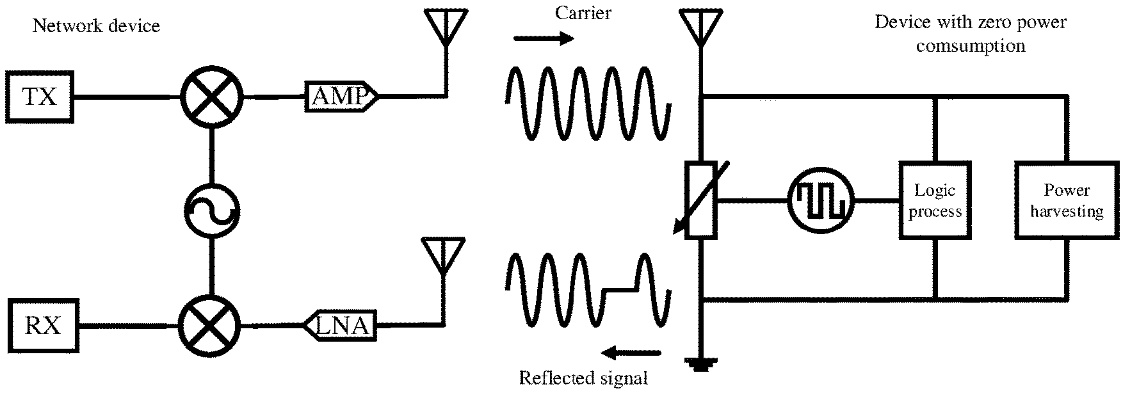
FIG. 3 is a schematic diagram of a communication principle of back scattering according to some embodiments of the present disclosure.

FIG. 3 is a schematic diagram of a communication principle of back scattering according to some embodiments of the present disclosure. As shown in FIG. 3, a device with zero power consumption receives a carrier signal transmitted by a network device, and harvests power through a radio frequency (RF) power harvesting module, that is, a power harvesting module, then supplies power to a low-power-consumption processing module, that is, a logic processing module in FIG. 3, modulates the carrier signal, and performs back scattering.

It should be understood that since the carrier signal transmitted by the above network device is configured to provide power to the device with zero power consumption, the carrier signal is also called as a power supply signal. Based on this, the power supply signal involved in some embodiments of the present disclosure is also called the carrier signal in some cases, and the carrier signal is also called the power supply signal in some cases.

It should be understood that the communication principle of back scattering shown in FIG. 3 is explained through the device with zero power consumption and the network device. In fact, any device with the back scattering communication function and any device capable of transmitting carrier signal to provide power, may implement the back scattering.

Main characteristics of the communication principle of back scattering are as follows.

(1) The terminal device does not actively transmit a signal, and implements the back scattering communication by modulating an incoming wave signal.

(2) The terminal device does not rely on a traditional active power amplifier transmitter, and uses a low-power computing unit, which greatly reduces a complexity of hardware.

(3) Communication without battery may be implemented in combination with power harvesting.

Therefore, the terminal device may be a device with zero power consumption (such as a passive terminal, or even a semi passive terminal), or even a device with non zero power consumption, such as an ordinary terminal, but the ordinary terminal may perform the back scattering communication in some cases.

2. RF Power Harvesting

Figure 4:
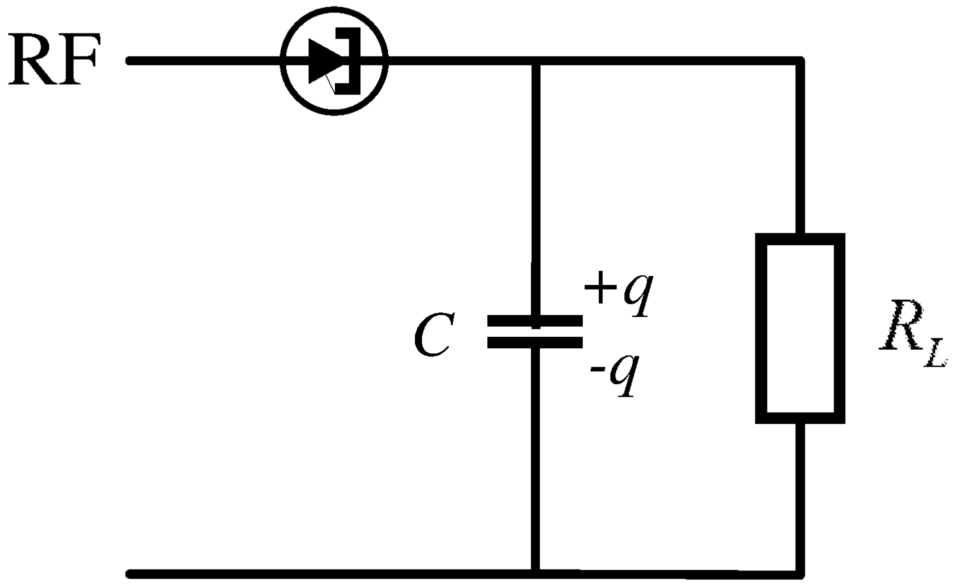
FIG. 4 is a schematic diagram of a principle of power harvesting according to some embodiments of the present disclosure.

FIG. 4 is a schematic diagram of a principle of power harvesting according to some embodiments of the present disclosure. As shown in FIG. 4, the terminal device may use the RF power harvesting module to harvest space electromagnetic wave power through electromagnetic induction, thereby driving (low-power operation and sensors, etc.) a load circuit and implementing communication without battery.

3. Load Modulation

The load modulation completes a modulation process by adjusting an electrical parameter of an oscillation loop of the terminal device according to a beat of a data stream to change a size and a phase of an impedance of the terminal device. A Load modulation technology includes resistance load modulation and capacitance load modulation.

Figure 5:
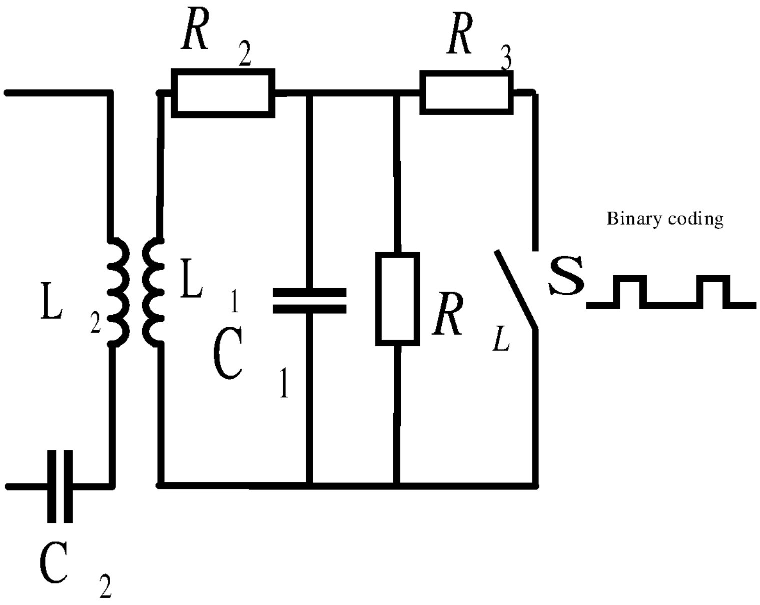
FIG. 5 is a schematic diagram of a circuit principle of a resistance load modulation according to some embodiments of the present disclosure.

In the resistance load modulation, a load is connected in parallel with a resistor, which is called a load modulation resistor. The resistor is turned on and off according to a clock of the data stream. The on-off of a switch S is controlled by binary data coding. A circuit principle of the resistance load modulation is shown in FIG. 5. In the capacitance load modulation, the load is connected in parallel with a capacitor, which replaces the load modulation resistor controlled by the binary data coding in FIG. 5.

4. Coding

Data transmitted by the electronic tag may represent binary "1" and "0" in different forms of code. A RFID system is usually adopted one of the following coding methods: Non Return Zero (NRZ) coding, Manchester coding, Unipolar RZ coding, differential biphase (DBP) coding, Miller coding and differential coding. Generally speaking, 0 and 1 are represented by different pulse signals.

As mentioned above, for the above passive terminal, even the semi passive terminal or active terminal, it may be impossible to use a battery to supply power in some cases, but is required to implement data transmission in back scattering. For such terminal, it is required to perform power harvesting before communication, and then performs communication. For such correspondent terminal, it is impossible to know when such terminals can harvest enough power for communication. Thus, the correspondent node cannot know when such terminals can receive the scheduling information. Based on this, how to transmit the scheduling information is a technical problem to be solved in the present disclosure. For example, in a cellular passive Internet of Things, when both the power supply signal and the scheduling information are transmitted by a network device, a location of a passive terminal is unknown to the network device before communication. Since the power of the power supply signal will attenuate with distance, the farther the terminal is from the network device, the greater the required charging duration. Since the network device does not know a location of each terminal, nor when the terminal has harvested enough power for communication, such that the network device cannot know when the terminal may receive the scheduling information.

The technical solution of some embodiments of the present disclosure is described in detail below.

Embodiment I

Figure 6:
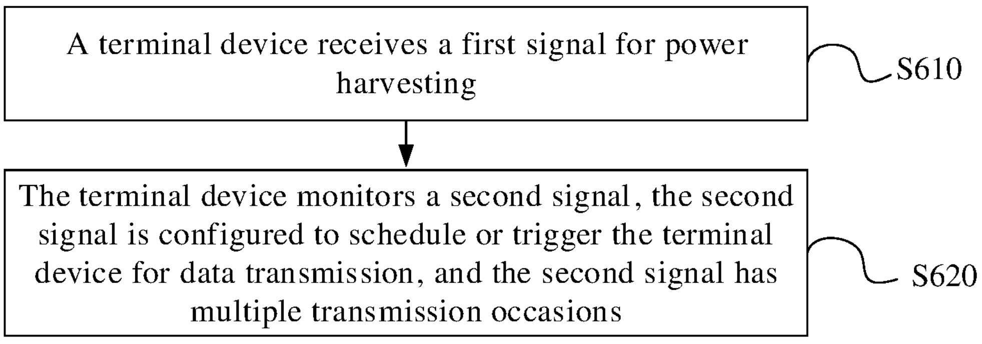
FIG. 6 is a flowchart of a wireless communication method according to some embodiments of the present disclosure.

FIG. 6 is a flowchart of a wireless communication method according to some embodiments of the present disclosure. The method may be performed by a terminal device, which has a back scattering communication function. The terminal device may be a device with zero power consumption, such as a passive terminal, even a semi passive terminal, or a device with non zero power consumption, which is a common device, but may perform the back scattering communication in some cases. As shown in FIG. 6, the method includes the following operations.

At operation 5610, a terminal device receives a first signal for power harvesting.

At operation 5620, the terminal device monitors a second signal, the second signal is configured to schedule or trigger the terminal device for data transmission, and the second signal has multiple transmission occasions (TOs).

It should be understood that the first signal is configured to supply power for the terminal device. Therefore, the first signal is the above power supply signal.

It should be understood that the technical solution in some embodiments of the present disclosure is applicable to various communication systems, such as a cellular Internet of Things, a cellular passive Internet of Things, and even a D2D communication system. Based on this, the first signal may be generated by a communication device required to communicate with the terminal device. For example, in the cellular passive Internet of Things, the first signal may be generated by the network device. In some embodiments, the first signal may not be generated by the communication device currently required to communicate with the terminal device. For example, in the cellular passive Internet of Things, the first signal may be generated by other devices as long as the other terminal devices may generate the first signal, for example, the first signal is generated by other micro base stations, smart gateways, charging stations, or smart phones.

In some embodiments, the network device may continuously or intermittently transmit the first signal, which is not limited.

In some embodiments, when the network device intermittently transmits the first signal, a time interval between the first signals may be predefined or configured, which is not limited.

In some embodiments, from a perspective of frequency band, a radio wave configured for power supply may be in a low frequency, an intermediate frequency, or a high frequency, etc., which is not limited.

In some embodiments, from a perspective of wave form, the radio wave configured for power supply may be a sine wave, a square wave, a triangular wave, a pulse wave, or a rectangular wave, etc., which is not limited.

In some embodiments, the first signal may be a signal specified in the 3rd Generation Partnership Project (3GPP) standard. That is, the first signal and a signal configured for data transmission are same signals, which may be a physical downlink control channel (PDCCH) or a Physical Downlink Shared Channel (PDSCH), etc.

It should be understood that the second signal is also called as scheduling information or triggering information, which is not limited. The second signal is generated by a communication device communicating with the terminal device, such as a network device or other terminal device, which is not limited.

In some embodiments, from a perspective of frequency band, a radio wave carrying the second signal may be in a low frequency, an intermediate frequency, or a high frequency, etc., which is not limited.

In some embodiments, from a perspective of wave form, the radio wave carrying the second signal may be a sine wave, a square wave, a triangular wave, a pulse wave, or a rectangular wave, etc., which is not limited.

In some embodiments, the second signal may be a signal specified in the 3GPP standard, for example, the second signal may be a PDCCH, etc., which is not limited.

It should be understood that the second signal and the first signal may be generated by a same communication device or by different devices. When the second signal and the first signal are generated by a same communication device, the second signal and the first signal may be two independent signals, or the second signal may be carried in the first signal. For example, in a cellular passive network, the network device may continuously generate the first signal, but the first signal intermittently carries the second signal at multiple occasions.

In some embodiments, when the first signal and the second signal are two independent signals, the two signals may be transmitted in one frequency band or not.

It should be understood that the first signal is a radio frequency carrier signal, and the network device may modulate carrier information to enable the first signal to carry the second signal. Common modulation methods include but are not limited to the following: Amplitude Shift Keying (ASK), Frequency Shift Keying (FSK) and Phase Shift Keying (PSK). The ASK includes Double-Sideband Amplitude Shift Keying (DSB-ASK), Single-Sideband Amplitude Shift Keying (SSB-ASK), or Phase-Reverse Amplitude Shift Keying (PR-ASK).

In some embodiments, times interval between adjacent transmission occasions in multiple transmission occasion of the second signal may be same or different, which is not limited.

In the present disclosure, even though the communication device cannot know when the terminal device may harvest enough power, the communication device may transmit the second signal at multiple transmission occasions, such that the terminal device may receive the second signal at a certain transmission occasion after harvesting enough power.

Embodiment II

In some embodiments, the second signal is transmitted periodically.

In some embodiments, a transmission period of the second signal is fixed or selected from multiple periods. For example, the transmission period of the second signal is fixed as T1 or selected from a set {T1, T2, T3, . . . }.

In some embodiments, the transmission period of the second signal is randomly selected from the multiple periods or selected from the multiple periods according to a first preset rule.

In some embodiments, the first preset rule is any of, but not limited to the following: selecting a maximum period of the above multiple periods, selecting a minimum period of the above multiple periods, selecting a period corresponding a largest index when each period corresponds to a unique index, and selecting a period corresponding a smallest index when each period corresponds to a unique index.

It should be understood that the less the transmission period of the second signal is, the less the average duration is for the terminal device to perform invalid monitoring. On the contrary, the greater the transmission period of the second signal is, the greater the average duration is for the terminal device to perform invalid monitoring.

In some embodiments, the second signal has a same or different transmission period for the terminal device and other terminal devices that have different at least one of a location, a processed service type, and a terminal type. In some embodiments, the second signal has a same or different transmission period for the terminal device and other terminal devices that have different at least one of a distance from the network device, a processed service type, and a terminal type.

For example, when the first signal and the second signal are generated by a same network device, the network device may determine its distance from a terminal device according to a location of the terminal device. When UE1 is farther away from the network device than UE2 is, the network device transmits the second signal to UE1 in a less transmission period than that for UE2 because the power of the first signal will attenuate with the distance, the farther the terminal is from the network device, the greater the required charging duration is.

For example, when the first signal and the second signal are generated by same network device, and UE1 is farther away from the network device than UE2 is. Since the power of the first signal will attenuate with distance, the farther the terminal is from the network device, the greater the charging duration becomes. The network device transmits the second signal to UE1 in a less transmission period than that for UE2.

For example, when the first signal and the second signal are generated by a same network device, a service type processed by UE1 is a video type, and a service type processed by UE2 is a voice type. Since the video type is more complex than the voice type, the power of UE1 attenuates faster. Therefore, the network device transmits the second signal to UE1 in a less transmission period than that for UE2.

For example, when the first signal and the second signal are generated by same network device, UE1 is a passive terminal, and UE2 is a semi passive terminal. Therefore, the network device transmits the second signal to UE1 in a less transmission period than that for UE2.

It should be understood that, for terminal devices of which some of the locations, the processed service types, and the terminal types are different, the transmission period of the second signal may be determined based on one of some items, which is not limited. For example, when two terminal devices are in different locations and process different service types, the transmission period of the second signal may be determined based on the locations of the two terminal devices.

In some embodiments, the second signal is transmitted in a third preset time interval with respect to the first signal. The third preset time interval is greater than or equal to 0. For example, the second signal may be transmitted simultaneously with the first signal, or the third preset time interval is same as the transmission period of the second signal, or the third preset time interval is greater than the transmission period of the second signal, or the third preset time interval is less than the transmission period of the second signal.

In some embodiments, the third preset time interval is fixed or selected from multiple preset time intervals.

In some embodiments, the third preset time interval is randomly selected from the multiple preset time intervals or selected from the multiple preset time intervals according to a seventh preset rule.

In some embodiments, the seventh preset rule is any of, but not limited to the following: selecting a time interval that is same as the transmission period of the second signal from the above multiple preset time intervals, selecting a maximum preset time interval from the above multiple preset time intervals, selecting a minimum preset time interval from the above multiple preset time intervals, selecting a preset time interval corresponding a largest index when each preset time interval corresponds to a unique index, and selecting a preset time interval corresponding a smallest index when each preset time interval corresponds to a unique index.

In some embodiments, the second signal has a same or different third preset time interval for the terminal device and other terminal devices that have different at least one of a location, a processed service type, and a terminal type. In some embodiments, the second signal has a same or different third preset time interval for the terminal device and other terminal devices that have different at least one of a distance from the network device, a processed service type, and a terminal type.

For example, when the first signal and the second signal are generated by a same network device, the network device may determine its distance from the terminal device according to a location of a terminal device. When UE1 is farther away from the network device than UE2 is, for UE1, the third preset time interval between the second signal and the first signal is greater than that for UE2 because the power of the first signal will attenuate with the distance, the farther the terminal is from the network device, the greater the required charging duration is. On the contrary, for UE2, the third preset time interval between the second signal and the first signal is less than that for UE1.

For example, when the first signal and the second signal are generated by a same network device, and UE1 is farther away from the network device than UE2. Since the power of the first signal will attenuate with distance, the farther the terminal is from the network device, for UE1, the third preset time interval between the second signal and the first signal is greater than that for UE2. On the contrary, for UE2, the third preset time interval between the second signal and the first signal is less than that for UE1.

For example, when the first signal and the second signal are generated by a same network device, a service type processed by UE1 is a video type, and a service type processed by UE2 is a voice type. Since the video type is more complex than the voice type, the power of UE1 attenuates faster. Therefore, for UE1, the third preset time interval between the second signal and the first signal should be greater than that for UE2. On the contrary, for UE2, the third preset time interval between the second signal and the first signal is less than that for UE1.

For example, when the first signal and the second signal are generated by same network device, UE1 is a passive terminal, and UE2 is a semi passive terminal. Therefore, for UE1, the third preset time interval between the second signal and the first signal should be greater than that for UE2. On the contrary, for UE2, the third preset time interval between the second signal and the first signal is less than that for UE1.

It should be understood that, for terminal devices of which some of the location, the processed service of type, and the terminal type are different, the third preset time interval may be determined based on one of some items, which is not limited. For example, when two terminal devices are in different locations and process different service types, the third preset time interval may be determined based on the locations of the terminal devices.

In some embodiments, the terminal device monitors the second signal in response to harvesting enough power. For example, the terminal device monitors the second signal, in response to the power of the terminal device being greater than or equal to a preset power.

In some embodiments, the preset power may be 80% or 70% etc., of the full power of the terminal device, which is not limited.

In some embodiments, the terminal device performs data transmission in back scattering after K time units, in response to the second signal being monitored, K is a positive integer.

Figure 7:
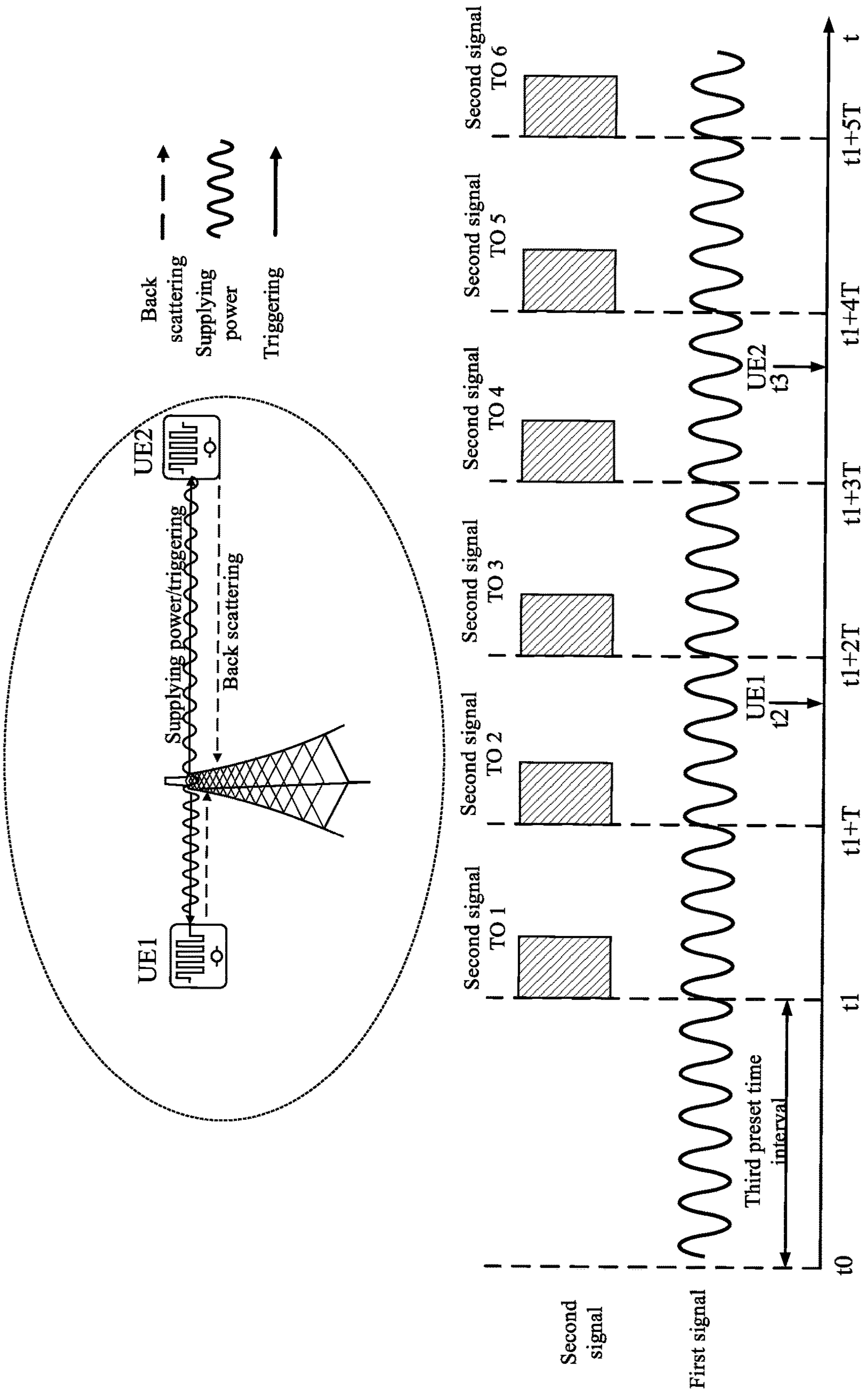
FIG. 7 is a schematic diagram of periodically transmitting a second signal according to some embodiments of the present disclosure.

For example, FIG. 7 is a schematic diagram of periodically transmitting a second signal according to some embodiments of the present disclosure. As shown in FIG. 7, there are two devices with zero power consumption, i.e., UE1 and UE2 within a coverage of a network device, and UE1 is closer to the network device than UE2 is. The network device starts to transmit the first signal at t0. the first signal is transmitted continuously in FIG. 7 as an example, but not limited to continuous transmission, the first signal may also be transmitted intermittently. Then the second signal may be transmitted after the third preset time interval, and the transmission period of the second signal is T. It should be understood that the second signal is transmitted periodically, which means that the second signal has multiple transmission occasions. As shown in FIG. 7, the second signal is transmitted at transmission occasion 1, transmission occasion 2, and transmission occasion 3, etc. As shown in FIG. 7, UE1 harvests enough power at t2 to monitor the second signal. Accordingly, UE1 may monitor the second signal at t1+2T (that is, transmission occasion 3 of the second signal), and then parse the second signal to perform data transmission according to the second signal. Similarly, when UE2 harvests enough power at t3, it may monitor the second signal. Accordingly, UE2 may monitor the second signal at t1+4T (that is, the transmission occasion 5 of the second signal), and then parse the second signal to perform data transmission according to the second signal.

In the present disclosure, even though the communication device cannot know when the terminal device may harvest enough power, the communication device may periodically transmit the second signal, such that the terminal device may receive the second signal at a certain transmission occasion after harvesting enough power. In addition, when the power harvested by the terminal device reaches the preset power, which means that the terminal device has harvested enough power, such that the terminal device may monitor the second signal. On the contrary, when the power harvested by the terminal device does not reach the preset power, the terminal device is not required to monitor the second signal, such that the power consumption may be reduced, and subsequent data transmission will not be affected due to excessive power consumption.

Embodiment III

In some embodiments, the second signal is transmitted in multiple transmission periods that are switched.

In some embodiments, the above multiple transmission periods may be completely different. For example, the communication device is adopted T1, T2, T3, and other periods to transmit the second signal in sequence. In some embodiments, the above multiple transmission periods may be partially different and partially same. For example, the communication device transmits the second signal in T1, T2, T1, T2, and other periods in sequence.

In some embodiments, the transmission periods of the second signal are switched every a first preset time interval. That is, the communication device switches the transmission periods of the second signal every the first preset time interval. For example, the communication device firstly adopts period T1 to transmit the second signal, then adopts period T2 to transmit the second signal after the first preset time interval, and then adopts T3 to transmit the second signal after the first preset time interval.

In some embodiments, the first preset time interval is fixed or selected from multiple time intervals.

In some embodiments, when the first signal and the second signal are generated by a same network device, the first preset time interval may be greater than a charging duration of a terminal at an edge of a cell covered by the network device. In some embodiments, the first preset time interval may be less than or equal to the charging duration of the terminal at the edge of the cell covered by the network device, which is not limited.

In some embodiments, the first preset time interval is randomly selected from the multiple time intervals or selected from the multiple time intervals according to a third preset rule.

In some embodiments, the third preset rule is any of, but not limited to the following: selecting a maximum time interval from the above multiple time intervals, selecting a minimum time interval from the above multiple time intervals, selecting a time interval a largest index when each time interval corresponds to a unique index, and selecting a time interval corresponding a smallest index when each time interval corresponds to a unique index.

In some embodiments, each transmission period of the second signal is fixed or selected from multiple periods.

It should be understood that the less the transmission period of the second signal is, the less the average duration is for the terminal device to perform invalid monitoring. On the contrary, the greater the transmission period of the second signal is, the greater the average duration is for the terminal device to perform invalid monitoring.

In some embodiments, each transmission period of the second signal is randomly selected from the multiple periods or selected from the multiple periods according to a second preset rule.

In some embodiments, the second preset rule is any of, but not limited to the following rules: a rule of cyclic selection in a descending order of the transmission periods of the second signal, a rule of cyclic selection in an ascending order of the transmission periods of the second signal, and a rule of selecting according to a particular pattern. For example, when the above multiple periods are {T1, T2, T3, T4, T5, T6} respectively, and T1>T2>T3>T4>T5>T6, the communication device may transmit the second signal at T1, T2, T3, T4, T5, T6 in sequence, which are switched every the first preset time interval. When the second signal is transmitted at T6, and after the first preset time interval, the communication device transmits the second signal at T1 again.

For example, when the above multiple periods are {T1, T2, T3, T4, T5, T6} respectively, and T1>T2>T3>T4>T5>T6, the communication device may transmit the second signal at T6, T5, T4, T3, T2, T1 in sequence, which are switched every the first preset time interval. When the second signal is transmitted at T1, and after the first preset time interval, the communication device transmits the second signal at T6 again.

For example, when the particular pattern is {T1, T4, T5}, the communication device may transmit the second signal at T1, T4, T5 in sequence which are switched every the first preset time interval. When the second signal is transmitted at T5, and after the first preset time interval, the communication device may transmit the second signal at T1 again.

In some embodiments, the second signal is transmitted in a third preset time interval with respect to the first signal. The third preset time interval is greater than or equal to 0. For example, the second signal may be transmitted simultaneously with the first signal, or the third preset time interval is same as the transmission period of the second signal, or the third preset time interval is greater than the transmission period of the second signal, or the third preset time interval is less than the transmission period of the second signal.

In some embodiments, the third preset time interval is fixed or selected from multiple preset time intervals.

In some embodiments, the third preset time interval is randomly selected from the multiple preset time intervals or selected from the multiple preset time intervals according to the seventh preset rule.

In some embodiments, the seventh preset rule is any of, but not limited to the following: selecting a time interval that is same as the transmission period of the second signal from the above multiple preset time intervals, selecting a maximum preset time interval from the above multiple preset time intervals, selecting a minimum preset time interval from the above multiple preset time intervals, selecting a preset time interval corresponding a largest index when each preset time interval corresponds to a unique index, and selecting a preset time interval corresponding a smallest index when each preset time interval corresponds to a unique index.

In some embodiments, the second signal has a same or different third preset time interval for the terminal device and other terminal devices that have different at least one of a location, a processed service type, and a terminal type. In some embodiments, the second signal has a same or different third preset time interval for the terminal device and other terminal devices that have different at least one of a distance from the network device, a processed service type, and a terminal type. The examples how to determine the third preset time interval may refer to that in the embodiment II, which is not repeated.

In some embodiments, the terminal device monitors the second signal in response to harvesting enough power. For example, the terminal device monitors the second signal, in response to the power of the terminal device being greater than or equal to the preset power.

In some embodiments, the preset power may be 80% or 70% etc., of the full power of the terminal device, which is not limited.

In some embodiments, the terminal device performs data transmission in back scattering after K time units, in response to the second signal being monitored, K is a positive integer.

Figure 8:
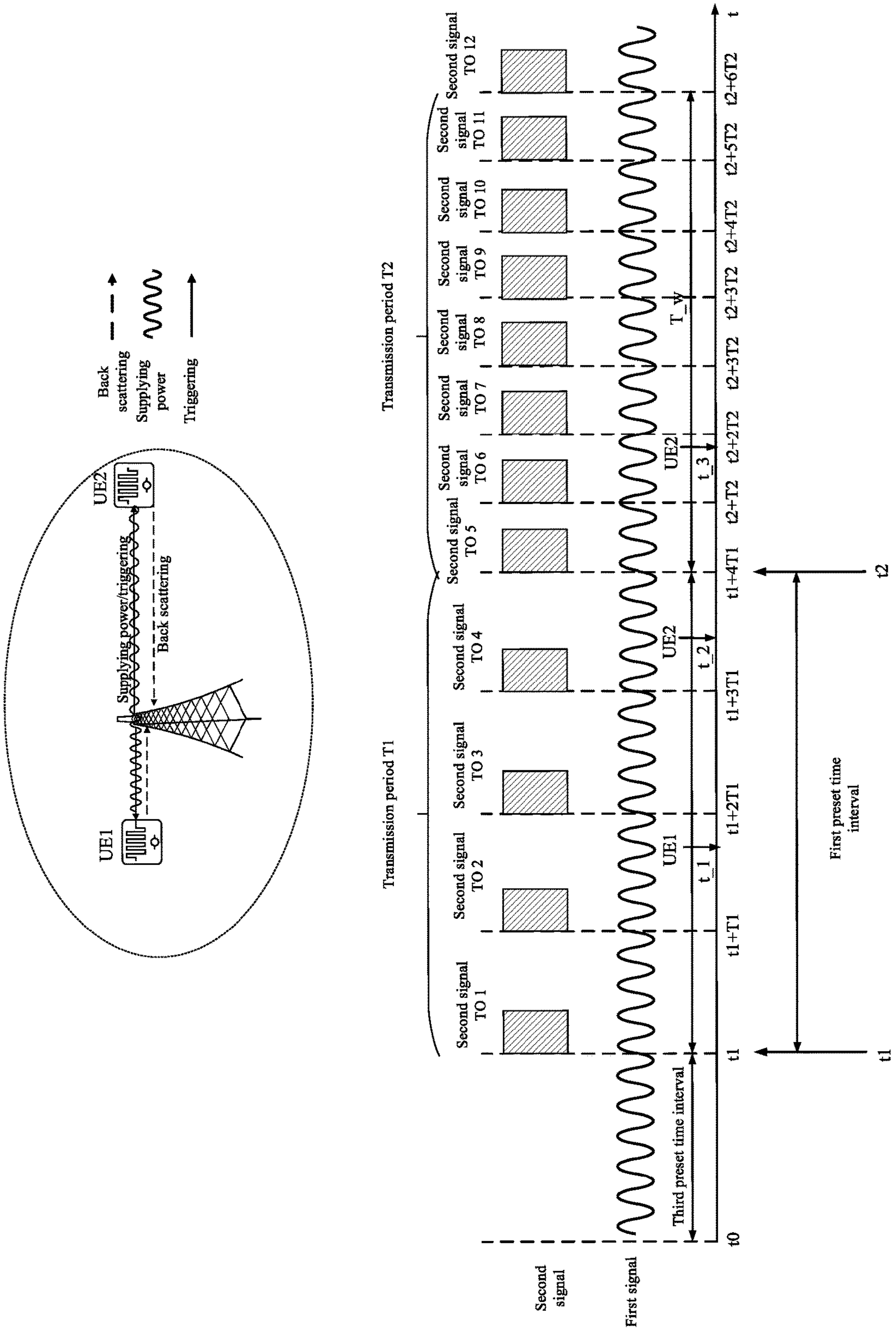
FIG. 8 is a schematic diagram of adaptively periodically transmitting a second signal according to some embodiments of the present disclosure.

For example, FIG. 8 is a schematic diagram of adaptively periodically transmitting a second signal according to some embodiments of the present disclosure. As shown in FIG. 8, there are two devices with zero power consumption, i.e., UE1 and UE2 within the coverage of the network device, and UE1 is closer to the network device than UE2. The network device starts to transmit the first signal at t0. In FIG. 8, the first signal is transmitted continuously as an example, but not limited to continuous transmission. The first signal may also be transmitted intermittently. Then the second signal may be transmitted after the third preset time interval. The network device may transmit the second signal in T1. After the first preset time interval, that is, t2, the second signal is transmitted in T2. It should be understood that an adaptive periodic transmission of the second signal means that the second signal has multiple transmission occasions. As shown in FIG. 8, the second signal is transmitted at transmission occasion 1, transmission occasion 2, and transmission occasion 3, etc. As shown in FIG. 8, UE1 harvests enough power at t_1 to monitor the second signal. Accordingly, UE1 may monitor the second signal at t1+2T1 (that is, the transmission occasion 3 of the second signal), and then parse the second signal to perform data transmission according to the second signal. UE2 harvests enough power at t_2 to monitor the second signal. Since UE2 is at the edge of the cell, the power of the power supply signal is severely attenuated, resulting in low charging efficiency of UE2. The second signal is required to be monitored from t_2 to t1+4T1, which will lead to power consumption, and demodulation of the second signal at transmission occasion 5 may not be completed or the power is insufficient to perform a processing related to the back scattering communication after demodulation, such that UE2 is required to continue to be charged. The network device starts to transmit the second signal in a new period T2 starting at t2, and UE2 harvests enough power at t_3 to monitor the second signal, monitors the second signal at t2+2T2 (that is, the transmission occasion 7 of the second signal), and then parse the second signal to perform data transmission according to the second signal.

In the present disclosure, even though the communication device cannot know when the terminal device may harvest enough power, the communication device may adaptively transmit the second signal, such that the terminal device may receive the second signal at a certain transmission occasion after harvesting enough power. In addition, when the power harvested by the terminal device reaches the preset power, which means that the terminal device has harvested enough power, and then the terminal device may monitor the second signal. On the contrary, when the power harvested by the terminal device does not reach the preset power, the terminal device is not required to monitor the second signal, such that the power consumption may be reduced, and subsequent data transmission will not be affected due to excessive power consumption.

Embodiment IV

In some embodiments, the second signal is transmitted in a particular pattern.

In some embodiments, the particular pattern is configured to determine different transmission occasions of the second signal.

In some embodiments, the particular pattern is an aperiodic transmission pattern.

In some embodiments, a time interval between each adjacent two transmission occasions in the particular pattern is different partly.

In some embodiments, the time interval between the each adjacent two transmission occasions varies over time periodically, to be smaller, or to be larger, etc. In some embodiments, the communication device is set with multiple time periods, time intervals between adjacent second signals in any time period are same, and time intervals between adjacent second signals in different time periods are different. For example, in some embodiments, the communication device is set with multiple time periods A, B, and C in sequence, time intervals between adjacent second signals in any of A, B, C are same, time intervals between adjacent second signals in A are greater than time intervals between adjacent second signals in B, and the time intervals between adjacent second signals in B are greater than a time interval between adjacent second signals in C.

It should be understood that the less the time interval between adjacent second signals is, the less the average duration is for the terminal device to perform invalid monitoring. On the contrary, the greater the time interval between adjacent second signals is, the greater the average duration is for the terminal device to perform invalid monitoring.

In some embodiments, the particular pattern is fixed or selected from multiple patterns.

In some embodiments, the particular pattern is randomly selected from the multiple patterns or selected from the multiple patterns according to a fourth preset rule.

In some embodiments, the fourth preset rule is any of, but not limited to the following: selecting a pattern corresponding a largest index when each pattern corresponds to a unique pattern, or selecting a pattern corresponding a smallest index when each pattern corresponds to a unique pattern.

In some embodiments, the second signal is transmitted in a third preset time interval with respect to the first signal. The third preset time interval is greater than or equal to 0. For example, the second signal may be transmitted simultaneously with the first signal, or the third preset time interval is same as the transmission period of the second signal, or the third preset time interval is greater than the transmission period of the second signal, or the third preset time interval is less than the transmission period of the second signal.

In some embodiments, the third preset time interval is fixed or selected from multiple preset time intervals.

In some embodiments, the third preset time interval is randomly selected from the multiple preset time intervals or selected from the multiple preset time intervals according to the seventh preset rule.

In some embodiments, the seventh preset rule is any of, but not limited to the following: selecting a time interval that is same as the transmission period of the second signal from the above multiple preset time intervals, selecting a maximum preset time interval from the above multiple preset time intervals, selecting a minimum preset time interval from the above multiple preset time intervals, selecting a preset time interval corresponding a largest index when each preset time interval corresponds to a unique index, and selecting a preset time interval corresponding a smallest index when each preset time interval corresponds to a unique index.

In some embodiments, the second signal has a same or different third preset time interval for the terminal device and other terminal devices that have different at least one of a location, a processed service type, and a terminal type. In some embodiments, the second signal has a same or different third preset time interval for the terminal device and other terminal devices that have different at least one of a distance from the network device, a processed service type, and a terminal type. The examples how to determine the third preset time interval may refer to that is the embodiment II, which is not repeated.

In some embodiments, the terminal device monitors the second signal in response to harvesting enough power. For example, the terminal device monitors the second signal, in response to the power of the terminal device being greater than or equal to the preset power.

In some embodiments, the preset power may be 80% or 70% etc., of the full power of the terminal device, which is not limited.

In some embodiments, the terminal device performs data transmission in back scattering after K time units, in response to the second signal being monitored, K is a positive integer.

Figure 9:
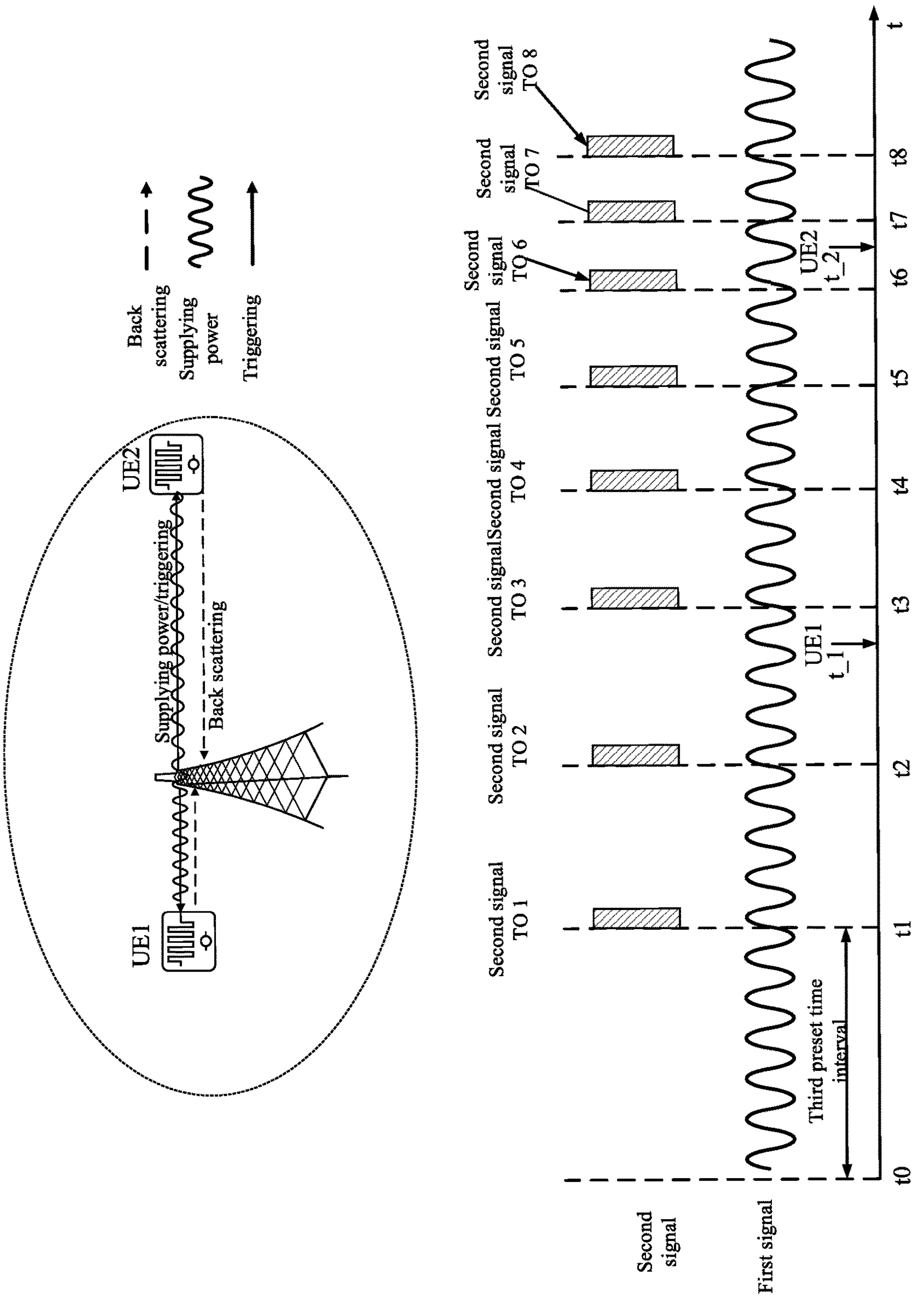
FIG. 9 is a schematic diagram of transmitting a second signal in a particular pattern according to some embodiments of the present disclosure.

For example, FIG. 9 is a schematic diagram of transmitting a second signal in a particular pattern according to some embodiments of the present disclosure. As shown in FIG. 9, there are two devices with zero power consumption, i.e., UE1 and UE2 within the coverage of the network device, and UE1 is closer to the network device than UE2. The network device starts to transmit the first signal at t0. In FIG. 9, the first signal is transmitted continuously as example, but not limited to continuous transmission. The first signal may also be transmitted intermittently. Then the second signal may be transmitted after the third preset time interval. The network device may transmit the second signal in the particular pattern. It should be understood that the second signal is transmitted in the particular pattern, which means that the second signal has multiple transmission occasions. As shown in FIG. 9, the second signal is transmitted at transmission occasion 1, transmission occasion 2, and transmission occasion 3, etc. Time intervals between different transmission occasions are different. Time intervals between transmission occasions are decreased progressively as an example, that is, the later the transmission occasion is, the less the time interval become. As shown in FIG. 9, UE1 harvests enough power at t_1 to monitor the second signal, then parse the second signal to perform data transmission according to the second signal. Accordingly, UE1 may monitor the second signal at t3 (that is, the transmission occasion 3 of the second signal), and then parse the triggering signal to perform subsequent communication processes. Similarly, UE2 harvests enough power at t_2 to monitor the second signal, UE1 may monitor the second signal at t7 (that is, the transmission occasion 7 of the second signal), and then parse the triggering signal to perform subsequent communication processes.

In the present disclosure, even though the communication device cannot know when the terminal device may harvest enough power, the communication device may transmit the second signal in the particular pattern, such that the terminal device may receive the second signal at a certain transmission occasion after harvesting enough power. In addition, when the power harvested by the terminal device reaches the preset power, which means that the terminal device has harvested enough power, and then the terminal device may monitor the second signal. On the contrary, when the power harvested by the terminal device does not reach the preset power, the terminal device is not required to monitor the second signal, such that the power consumption may be reduced, and subsequent data transmission will not be affected due to excessive power consumption.

Embodiment V

In some embodiments, the second signal is transmitted in different particular patterns. That is, the communication device may adaptively select different particular patterns to transmit the second signal. For example, the communication device may select {particular pattern 1, particular pattern 2, particular pattern 3} to transmit the second signal.

In some embodiments, one particular pattern may be selected multiple times. For example, the communication device may select {particular pattern 1, particular pattern 1, particular pattern 3} to transmit the second signal.

In some embodiments, each particular pattern is configured to determine different transmission occasions of the second signal.

In some embodiments, each particular pattern may be aperiodic or periodic transmission pattern.

In some embodiments, for each particular pattern, a time interval between each adjacent two transmission occasions in the each particular pattern is different partly.

In some embodiments, the time interval between the each adjacent two transmission occasions varies over time periodically, to be smaller, or to be larger, etc. In some embodiments, the communication device is set with multiple time periods, time intervals between adjacent second signals in any time period are same, and time intervals between adjacent second signals in different time periods are different. For example, in some embodiments, the communication device is set with multiple time periods A, B, and C in sequence, time intervals between adjacent second signals in any of A, B, C are same, time intervals between adjacent second signals in A are greater than time intervals between adjacent second signals in B, and the time intervals between adjacent second signals in B are greater than time intervals between adjacent second signals in C.

It should be understood that the less the time interval between adjacent second signals is, the less the average duration is for the terminal device to perform invalid monitoring. On the contrary, the greater the time interval between adjacent second signals is, the greater the average duration is for the terminal device to perform invalid monitoring.

In some embodiments, each particular pattern of the second signal is fixed or selected from multiple patterns.

In some embodiments, each particular pattern of the second signal is randomly selected from the multiple patterns or selected from the multiple patterns according to a fifth preset rule.

In some embodiments, the fifth preset rule is any of, but not limited to the following: selecting particular patterns in a descending order of minimum intervals between adjacent transmission occasions from multiple patterns, selecting particular patterns in an ascending order of minimum intervals between adjacent transmission occasions from multiple patterns, selecting particular patterns in a descending order of maximum intervals between adjacent transmission occasions from multiple patterns, and selecting particular patterns in an ascending order of maximum intervals between adjacent transmission occasions in each pattern from multiple patterns For example, multiple patterns are particular pattern 1, particular pattern 2, and particular pattern 3, and an order of the minimum intervals between adjacent transmission occasions in particular pattern 1, particular pattern 2, and particular pattern 3 is a descending order. Therefore, the first particular pattern selected by the communication device is particular pattern 1, the second particular pattern is particular pattern 2, and the third particular pattern is particular pattern 3.

In some embodiments, the particular patterns of the second signal are switched every a second preset time interval.

In some embodiments, a second preset times interval between each adjacent two particular patterns of the particular patterns of the second signal is same or different. Therefore, it may be understood that each particular pattern has a corresponding second preset time interval. For example, a second preset time interval between a first particular pattern and a second particular pattern may be understood as a second preset time interval corresponding to the first particular pattern. A second preset time interval between the second particular pattern and a third particular pattern may be understood as a second pre set time interval corresponding to the second particular pattern, and so on.

It should be understood that in some embodiment, second preset time intervals between adjacent two particular patterns of the particular patterns are same, which may be understood that the communication device is set one second preset time interval for all particular patterns.

In some embodiments, for any particular pattern of the second signal, a second preset time interval corresponding to the any particular pattern is greater than or equal to a duration of the any particular pattern.

In some embodiments, a duration within the second preset time interval corresponding to the any particular pattern, in addition to the duration of the any particular pattern, is configured to repeat part or all of the any particular pattern, in response to the second preset time interval being greater than the duration of the any particular pattern. For example, a duration within the second preset time interval corresponding to the particular pattern 1, in addition to the duration of the particular pattern 1, is configured to repeat transmission occasion 3, or repeat transmission occasion 1, transmission occasion 2, and transmission occasion 3, etc., in response to the particular pattern 1 being {transmission occasion 1, transmission occasion 2, transmission occasion 3}, and its corresponding second preset time interval being greater than a duration of the particular pattern 1.

It should be understood that repeating transmission occasion here refers to continuing to repeat these transmission occasion beyond the duration of the particular pattern. For example, repeating transmission occasion 1, 2, and 3 may be understood as continuing to repeat these transmission occasion 1, 2, and 3 after the duration of the particular pattern, and time intervals between transmission occasion 1, 2, and 3 is consistent with time intervals between these transmission occasion in the particular pattern.

In some embodiments, the second preset time interval is fixed or selected from multiple time intervals.

In some embodiments, the second preset time interval is randomly selected from multiple the time intervals or selected from multiple the time intervals according to a sixth preset rule.

In some embodiments, the sixth preset rule is any of, but not limited to the following: selecting a maximum preset time interval from the above preset time intervals, selecting a minimum preset time interval from the above preset time intervals, selecting a preset time interval corresponding a largest index when each preset time interval corresponds to a unique index, and selecting a preset time interval corresponding a smallest index when each preset time interval corresponds to a unique index.

In some embodiments, the second signal is transmitted in a third preset time interval with respect to the first signal. The third preset time interval is greater than or equal to 0. For example, the second signal may be transmitted simultaneously with the first signal, or the third preset time interval is same as the transmission period of the second signal, or the third preset time interval is greater than the transmission period of the second signal, or the third preset time interval is less than the transmission period of the second signal.

In some embodiments, the third preset time interval is fixed or selected from multiple preset time intervals.

In some embodiments, the third preset time interval is randomly selected from the multiple preset time intervals or selected from the multiple preset time intervals according to the seventh preset rule.

In some embodiments, the seventh preset rule is any of, but not limited to the following: selecting a time interval that is same as the transmission period of the second signal from the above multiple preset time intervals, selecting a maximum preset time interval from the above multiple preset time intervals, selecting a minimum preset time interval from the above multiple preset time intervals, selecting a preset time interval corresponding a largest index when each preset time interval corresponds to a unique index, and selecting a preset time interval corresponding a smallest index when each preset time interval corresponds to a unique index.

In some embodiments, the second signal has a same or different third preset time interval for the terminal device and other terminal devices that have different at least one of a location, a processed service type, and a termina type. In some embodiments, the second signal has a same or different third preset time interval for the terminal device and other terminal devices that have different at least one of a distance from the network device, a processed service type, and a terminal type. The examples how to determine the third preset time interval may refer to that in the embodiment II, which is not repeated.

In some embodiments, the terminal device monitors the second signal in response to harvesting enough power. For example, the terminal device monitors the second signal, in response to the power of the terminal device being greater than or equal to the preset power.

In some embodiments, the preset power may be 80% or 70% etc., of the full power of the terminal device, which is not limited.

In some embodiments, the terminal device performs data transmission in back scattering after K time units, in response to the second signal being monitored, K is a positive integer.

Figure 10:
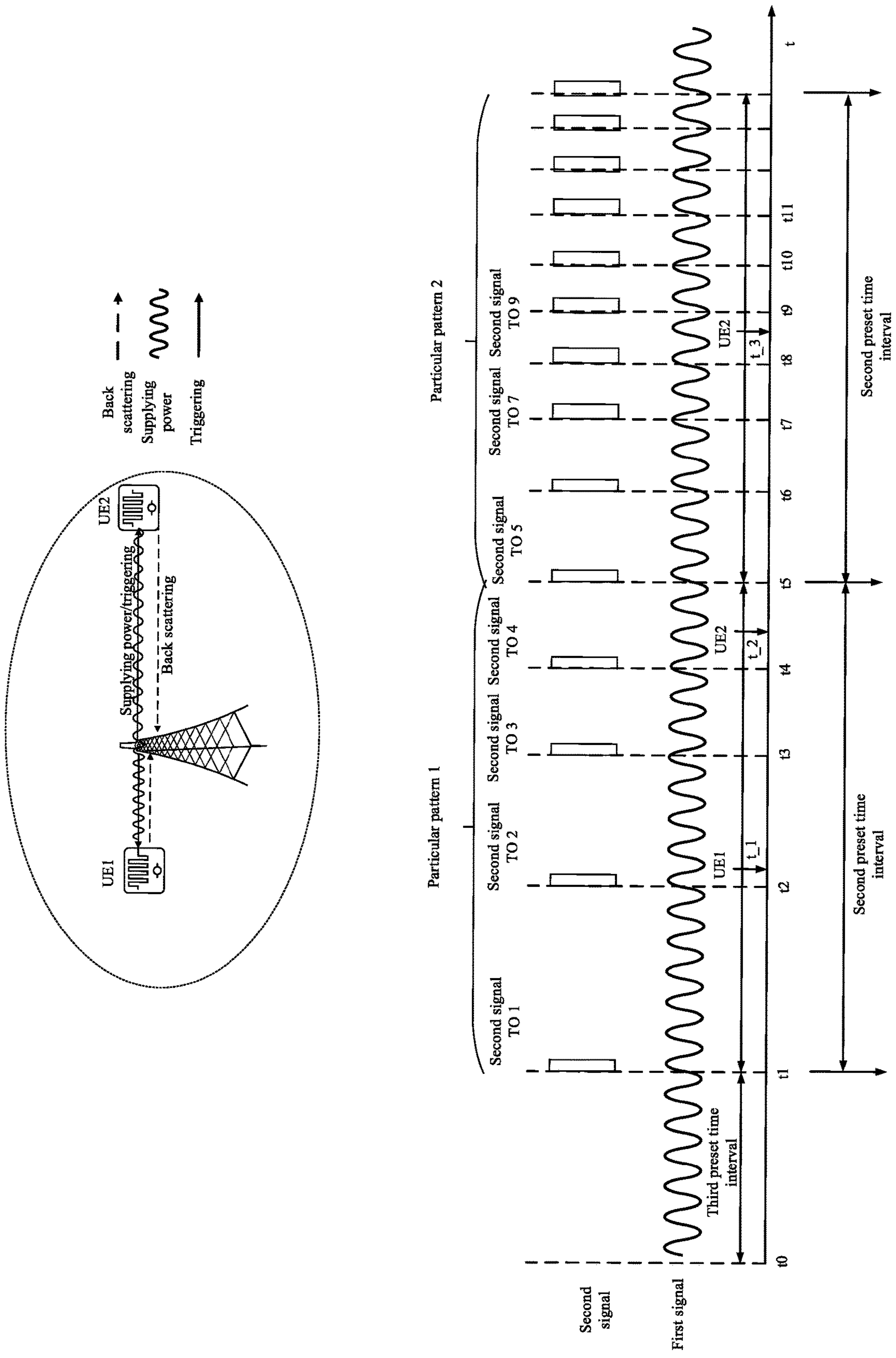
FIG. 10 is a schematic diagram of transmitting a second signal by adaptively selecting a particular pattern according to some embodiments of the present disclosure.

For example, FIG. 10 is a schematic diagram of transmitting a second signal by adaptively selecting a particular pattern according to some embodiments of the present disclosure. As shown in FIG. 10, there are two devices with zero power consumption, i.e., UE1 and UE2 within the coverage of the network device, and UE1 is closer to the network device than UE2. The network device starts to transmit the first signal at t0. In FIG. 10, the first signal is transmitted continuously as example, but not limited to continuous transmission. The first signal may also be transmitted intermittently. Then the second signal may be transmitted after the third preset time interval. The network device may transmit the second signal in an adaptive particular pattern. It should be understood that the second signal is transmitted in the adaptive particular pattern, which means that the second signal has multiple transmission occasions. As shown in FIG. 10, the second signal is transmitted at transmission occasion 1, transmission occasion 2, and transmission occasion 3, etc. As shown in FIG. 10, after the second preset time interval (the second preset time interval is equal to a duration of a respective particular pattern), the network device switches to another particular patter, and transmit the second signal in a particular pattern 2 at a second preset time interval+t1, i.e., t5. UE1 harvests enough power at t_1 to monitor the second signal. Accordingly, UE1 may monitor the second signal at t3 (that is, the transmission occasion 3 of the second signal), and then parse the second signal to perform data transmission according to the second signal. UE2 harvests enough power at t_2 to monitor the second signal. Since UE2 is at the edge of the cell, the power of the power supply signal is severely attenuated, resulting in low charging efficiency of UE2. The second signal is required to be monitored from t_2 to t5, which will lead to power consumption, and demodulation of the second signal at transmission occasion 5 may not be completed or the power is insufficient to perform a processing related to the back scattering communication after demodulation, such that UE2 is required to continue to be charged. The network device determines transmission occasions of the second signal in the particular pattern 2, starting from t5, and UE2 harvests enough power at t_3 to monitor the second signal, monitors the second signal at t9 (that is, the transmission occasion 9 of the second signal), and then parse the second signal to perform data transmission according to the second signal.

In the present disclosure, even though the communication device cannot know when the terminal device may harvest enough power, the communication device may adaptively select the particular pattern to transmit the second signal, such that the terminal device may receive the second signal at a certain transmission occasion after harvesting enough power. In addition, when the power harvested by the terminal device reaches the preset power, which means that the terminal device has harvested enough power, and then the terminal device may monitor the second signal. On the contrary, when the power harvested by the terminal device does not reach the preset power, the terminal device is not required to monitor the second signal, such that the power consumption may be reduced, and subsequent data transmission will not be affected due to excessive power consumption.

Embodiment VI

In some embodiments, the second signal is transmitted in a third preset time interval with respect to the first signal.

In some embodiments, the third preset time interval is greater than or equal to 0.

In some embodiments, the third preset time interval is greater than a preset threshold to ensure that the terminal device may harvest enough power.

In some embodiments, the third preset time interval is fixed or selected from multiple preset time intervals.

In some embodiments, the third preset time interval is randomly selected from the multiple preset time intervals or selected from the multiple preset time intervals according to the seventh preset rule.

In some embodiments, the seventh preset rule is any of, but not limited to the following: selecting a time interval that is same as the transmission period of the second signal from the above multiple preset time intervals, selecting a maximum preset time interval from the above multiple preset time intervals, selecting a minimum preset time interval from the above multiple preset time intervals, selecting a preset time interval corresponding a largest index when each preset time interval corresponds to a unique index, and selecting a preset time interval corresponding a smallest index when each preset time interval corresponds to a unique index.

In some embodiments, the second signal has a same or different third preset time interval for the terminal device and other terminal devices that have different at least one of a location, a processed service type, and a terminal type. In some embodiments, the second signal has a same or different third preset time interval for the terminal device and other terminal devices that have different at least one of a distance from the network device, a processed service type, and a terminal type. The examples how to determine the third preset time interval may refer to that in the embodiment II, which is not repeated.

In some embodiments, the terminal device monitors the second signal in response to harvesting enough power. For example, the terminal device monitors the second signal, in response to the power of the terminal device being greater than or equal to the preset power.

In some embodiments, the preset power may be 80% or 70% etc., of the full power of the terminal device, which is not limited.

In some embodiments, the terminal device performs data transmission in back scattering after K time units, in response to the second signal being monitored, K is a positive integer.

In the present disclosure, even though the communication device cannot know when the terminal device may harvest enough power, the communication device may transmit the second signal again the third preset time interval after transmitting the first signal, such that the terminal device may receive the second signal at a certain transmission occasion after harvesting enough power. In addition, when the power harvested by the terminal device reaches the preset power, which means that the terminal device has harvested enough power, and then the terminal device may monitor the second signal. On the contrary, when the power harvested by the terminal device does not reach the preset power, the terminal device is not required to monitor the second signal, such that the power consumption may be reduced, and subsequent data transmission will not be affected due to excessive power consumption.

Embodiment VII

Figure 11:
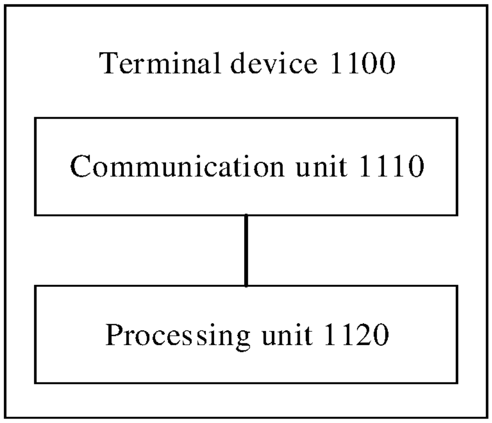
FIG. 11 is a schematic diagram of a terminal device according to some embodiments of the present disclosure.

FIG. 11 is a schematic diagram of a terminal device 1100 according to some embodiments of the present disclosure. As shown in FIG. 11, the terminal device 1100 includes: a communication unit 1110 and a processing unit 1120.

The communication unit 1110 is configured to receive a first signal for power harvesting.

The processing unit 1120 is configured to monitor a second signal, the second signal is configured to schedule or trigger the terminal device for data transmission, and the second signal has multiple transmission occasions.

In some embodiments, the second signal is transmitted periodically.

In some embodiments, a transmission period of the second signal is fixed or selected from multiple periods.

In some embodiments, the transmission period of the second signal is randomly selected from the multiple periods or selected from the multiple periods according to the first preset rule.

In some embodiments, the second signal has a same or different transmission period for the terminal device and other terminal devices that have different at least one of a location, a processed service type, and a terminal type.

In some embodiments, the second signal is transmitted in multiple transmission periods that are switched.

In some embodiments, each transmission period of the second signal is fixed or selected from multiple periods.

In some embodiments, each transmission period of the second signal is randomly selected from the multiple periods or selected from the multiple periods according to the second preset rule.

In some embodiments, the second preset rule is any of, but not limited to the following rules: a rule of cyclic selection in a descending order of the transmission periods of the second signal, a rule of cyclic selection in an ascending order of the transmission periods of the second signal.

In some embodiments, the transmission periods of the second signal are switched every a first preset time interval.

In some embodiments, the first preset time interval is fixed or selected from multiple time intervals.

In some embodiments, the first preset time interval is randomly selected from the multiple time intervals or selected from the multiple time intervals according to the third preset rule.

In some embodiments, the second signal is transmitted in a particular pattern.

In some embodiments, the particular pattern is configured to determine different transmission occasions of the second signal.

In some embodiments, a time interval between each adjacent two transmission occasions in the particular pattern is different partly.

In some embodiments, the time interval between the each adjacent two transmission occasions varies over time periodically, to be smaller, or to be larger, etc.

In some embodiments, the particular pattern is fixed or selected from multiple patterns.

In some embodiments, the particular pattern is randomly selected from the multiple patterns or selected from the multiple patterns according to the fourth preset rule.

In some embodiments, the second signal is transmitted in different particular patterns.

In some embodiments, each particular pattern is configured to determine different transmission occasions of the second signal.

In some embodiments, for each particular pattern, a time interval between each adjacent two transmission occasions in the each particular pattern is different partly.

In some embodiments, the time interval between the each adjacent two transmission occasions varies over time periodically, to be smaller, or to be larger, etc.

In some embodiments, each particular pattern of the second signal is fixed or selected from multiple patterns.

In some embodiments, each particular pattern of the second signal is randomly selected from the multiple patterns or selected from the multiple patterns according to the fifth preset rule.

In some embodiments, the particular patterns of the second signal are switched every a second preset time interval.

In some embodiments, a second preset time interval between each adjacent two particular patterns of the particular patterns of the second signal is same or different.

In some embodiments, for any particular pattern of the second signal, a second preset time interval corresponding to the any particular pattern is greater than or equal to a duration of the any particular pattern.

In some embodiments, a duration within the second preset time interval corresponding to the any particular pattern, in addition to the duration of the any particular pattern, is configured to repeat part or all of the any particular pattern, in response to the second preset time interval being greater than the duration of the any particular pattern.

In some embodiments, the second preset time interval is fixed or selected from multiple time intervals.

In some embodiments, the second preset time interval is randomly selected from the multiple time intervals or selected from multiple the time intervals according to the sixth preset rule.

In some embodiments, the second signal is transmitted in a third preset time interval with respect to the first signal.

In some embodiments, the third preset time interval is greater than or equal to 0.

In some embodiments, the third preset time interval is fixed or selected from multiple preset time intervals.

In some embodiments, the third preset time interval is randomly selected from the multiple preset time intervals or selected from the multiple preset time intervals according to the seventh preset rule.

In some embodiments, the second signal has a same or different third preset time interval for the terminal device and other terminal devices that have different at least one of a location, a processed service type, and a terminal type.

In some embodiments, the communication unit 1110 is also configured to perform data transmission in back scattering after K time units, in response to the second signal is monitored by the processing unit 1120, and K is a positive integer.

In some embodiments, the processing unit 1120 is configured to monitor the second signal, in response to the power of the terminal device being greater than or equal to a preset power.

In some embodiments, the above communication unit may be a communication interface or a transceiver, or an input/output interface of a communication chip or a system on chip. The processing unit may be one or more processors.

It should be understood that the terminal device 1100 according to some embodiment of the present disclosure may correspond to the terminal device in the method embodiments corresponding to FIG. 6, and the above and other operations and/or functions of each unit in the terminal device 1100 are to implement corresponding operations of the terminal device in the method embodiments corresponding to FIG. 6, which is not repeated here for simplicity.

Embodiment VIII

Figure 12:
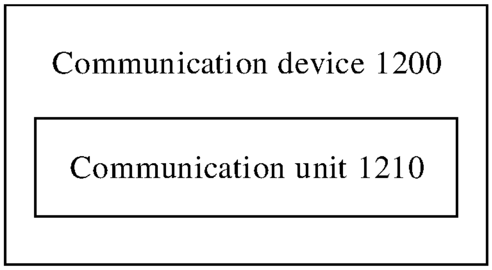
FIG. 12 is a schematic diagram of a communication device according to some embodiments of the present disclosure.

FIG. 12 is a schematic diagram of a communication device 1200 according to some embodiments of the present disclosure. As shown in FIG. 12, the communication device 1200 includes a communication unit 1210. The communication unit 1210 is configured to transmit the second signal at multiple transmission occasions, and the second signal is configured to schedule or trigger the terminal device for data transmission.

In some embodiments, the second signal is transmitted periodically.

In some embodiments, a transmission period of the second signal is fixed or selected from multiple periods.

In some embodiments, the transmission period of the second signal is randomly selected from the multiple periods or selected from the multiple periods according to the first preset rule.

In some embodiments, the second signal has a same or different transmission period for the terminal device and other terminal devices that have different at least one of a location, a processed service type, and a terminal type.

In some embodiments, the second signal is transmitted in multiple transmission periods that are switched.

In some embodiments, each transmission period of the second signal is fixed or selected from multiple periods.

In some embodiments, each transmission period of the second signal is randomly selected from the multiple periods or selected from the multiple periods according to the second preset rule.

In some embodiments, the second preset rule is any of, but not limited to the following rules: a rule of cyclic selection in a descending order of the transmission periods of the second signal, a rule of cyclic selection in an ascending order of the transmission periods of the second signal.

In some embodiments, the transmission periods of the second signal are switched every a first preset time interval.

In some embodiments, the first preset time interval is fixed or selected from multiple time intervals.

In some embodiments, the first preset time interval is randomly selected from the multiple time intervals or selected from the multiple time intervals according to the third preset rule.

In some embodiments, the second signal is transmitted in a particular pattern.

In some embodiments, the particular pattern is configured to determine different transmission occasions of the second signal.

In some embodiments, a time interval between each adjacent two transmission occasions in the particular pattern is different partly.

In some embodiments, the time interval between the each adjacent two transmission occasions varies over time periodically, to be smaller, or to be larger, etc.

In some embodiments, the particular pattern is fixed or selected from multiple patterns.

In some embodiments, the particular pattern is randomly selected from the multiple patterns or selected from the multiple patterns according to the fourth preset rule.

In some embodiments, the second signal is transmitted in different particular patterns.

In some embodiments, each particular pattern is configured to determine different transmission occasions of the second signal.

In some embodiments, for each particular pattern, a time interval between each adjacent two transmission occasions in the each particular pattern is different partly.

In some embodiments, the time interval between the each adjacent two transmission occasions varies over time periodically, to be smaller, or to be larger, etc.

In some embodiments, each particular pattern of the second signal is fixed or selected from multiple patterns.

In some embodiments, each particular pattern of the second signal is randomly selected from the multiple patterns or selected from the multiple patterns according to the fifth preset rule.

In some embodiments, the particular patterns of the second signal are switched every a second preset time interval.

In some embodiments, a second preset time interval between each adjacent two particular patterns of the particular patterns of the second signal is same or different.

In some embodiments, for any particular pattern of the second signal, a second preset time interval corresponding to the any particular pattern is greater than or equal to a duration of the any particular pattern.

In some embodiments, a duration within the second preset time interval corresponding to the any particular pattern, in addition to the duration of the any particular pattern, is configured to repeat part or all of the any particular pattern, in response to the second preset time interval being greater than the duration of the any particular pattern.

In some embodiments, the second preset time interval is fixed or selected from multiple time intervals.

In some embodiments, the second preset time interval is randomly selected from the multiple time intervals or selected from multiple the time intervals according to the sixth preset rule.

In some embodiments, the communication unit 1210 is also configured to transmit the first signal to the terminal device, and the first signal is configured to supply power to the terminal device.

In some embodiments, the second signal is transmitted in a third preset time interval with respect to the first signal.

In some embodiments, the third preset time interval is greater than or equal to 0.

In some embodiments, the third preset time interval is fixed or selected from multiple preset time intervals.

In some embodiments, the third preset time interval is randomly selected from the multiple preset time intervals or selected from the multiple preset time intervals according to the seventh preset rule.

In some embodiments, the second signal has a same or different third preset time interval for the terminal device and other terminal devices that have different at least one of a location, a processed service type, and a terminal type.

In some embodiments, the communication unit 1210 is also configured to receive data transmission by the terminal device in back scattering. The data transmission is performed after K time units, in response to the second signal being monitored by the terminal device, and K is a positive integer In some embodiments, the above communication unit may be a communication interface or a transceiver, or an input/output interface of a communication chip or a system on chip.

It should be understood that the communication device 1200 according to some embodiment of the present disclosure may correspond to the network device or other devices in the method embodiments corresponding to FIG. 6, and the above and other operations and/or functions of each unit in the communication device 1200 are to implement corresponding operations of the network device or other devices in the method embodiments corresponding to FIG. 6, which is not repeated here for simplicity.

Embodiment IX

Figure 13:
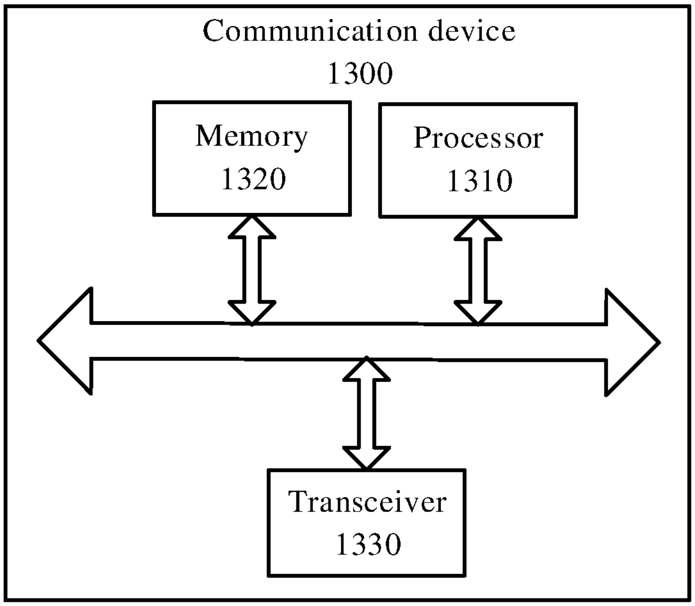
FIG. 13 is a schematic structural diagram of a communication device according to some embodiments of the present disclosure.

FIG. 13 is a schematic structural diagram of a communication device 1300 according to some embodiments of the present disclosure. The communication device 1300 shown in FIG. 13 includes a processor 1310, which may call and run a computer program from a memory to implement the method in some embodiments of the present disclosure.

In some embodiments, as shown in FIG. 13, the communication device 1300 may also include a memory 1320. The processor 1310 may call and run a computer program from the memory 1320 to implement the method in some embodiments of the present disclosure.

The memory 1320 may be a separate component independent of the processor 1310, or may be integrated in the processor 1310.

In some embodiments, as shown in FIG. 13, the communication device 1300 may also include a transceiver 1330, and the processor 1310 may control the transceiver 1330 to communicate with other devices. In some embodiments, the communication device 1300 may transmit information or data to other devices, or receive information or data transmitted by other devices.

The transceiver 1330 may include a transmitter and a receiver. The transceiver 1330 may further include antennas, and the number of the antennas may be one or more.

In some embodiments, the communication device 1300 may be the network device or other device in some embodiments of the present disclosure, and the communication device 1300 may implement corresponding operations implemented by the network device or other devices in all methods of the embodiments of the present disclosure. For simplicity, the corresponding operations are not repeated here.

In some embodiments, the communication device 1300 may be the terminal device of some embodiments of the present disclosure, and the communication device 1300 may implement corresponding operations implemented by the terminal device in all methods of the embodiments of the present disclosure. For simplicity, the corresponding operations are not repeated here.

Embodiment X

Figure 14:
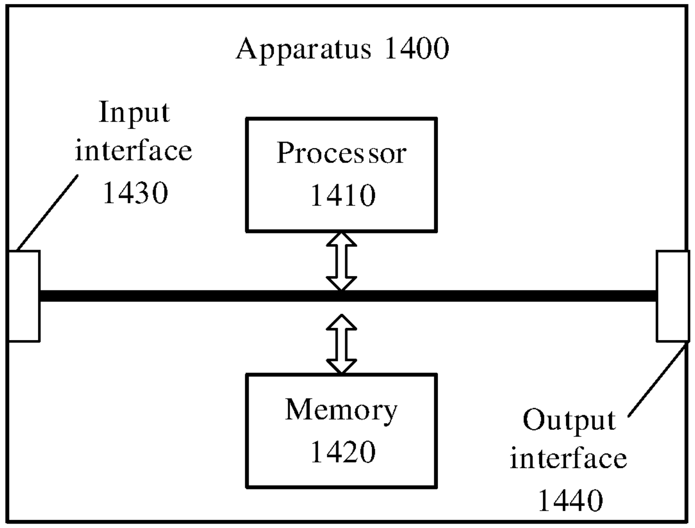
FIG. 14 is a schematic structural diagram of an apparatus according to some embodiments of the present disclosure.

FIG. 14 is a structural schematic diagram of an apparatus according to some embodiments of the present disclosure. The apparatus 1400 shown in FIG. 14 includes a processor 1410, which may call and run a computer program from a memory to implement the methods in the embodiments of the present disclosure.

In some embodiments, as shown in FIG. 14, the apparatus 1400 may also include memory 1420. The processor 1410 may call and run a computer program from the memory 1420 to implement the methods in the embodiments of the present disclosure.

The memory 1420 may be a separate component independent of the processor 1410, or be integrated in the processor 1410.

In some embodiments, the apparatus 1400 may also include an input interface 1430. The processor 1410 may control the input interface 1430 to communicate with other devices or chips. In some embodiments, the processor 1410 may obtain information or data transmitted by other devices or chips.

In some embodiments, the apparatus 1400 may also include an output interface 1440. The processor 1410 may control the output interface 1440 to communicate with other devices or chips. In some embodiments, the processor 1410 may output information or data to other devices or chips.

In some embodiments, the apparatus may be applied to the network device or other devices in the embodiments of the present disclosure, and the apparatus may implement corresponding operations implemented by the network device or other devices in the all methods of the embodiments of the present disclosure. For simplicity, the corresponding operations are not repeated here.

In some embodiments, the apparatus may be applied to the terminal device in the embodiments of the present disclosure, and the apparatus may implement the corresponding operations implemented by the terminal device in the all methods of the embodiments of the present disclosure. For simplicity, the corresponding operations are not repeated here.

In some embodiments, the apparatus mentioned in the embodiments of the present disclosure may also be a chip. For example, the apparatus may be a system level chip, a system chip, s chip system or system ship on chip.

It should be understood that the processor in some embodiments of the present disclosure may be an integrated circuit chip with a signal processing capability. In a process of implement above method, each operation of the above method embodiments may be completed by an integrated logic circuit of a hardware in the processor or instructions in a form of software. The above processors may be general purpose processors, Digital Signal Processors (DSPs), Application Specific Integrated Circuits (ASICs), Field Programmable Gate Arrays (FPGAs) or other programmable logic components, discrete gates or transistor logic components, or discrete hardware components. Each method, operation and logic block diagram disclosed in some embodiments of the present disclosure may be implemented or performed. The general processor may be a microprocessor or the processor may also be any conventional processor, etc. The operations in combination with the methods in some embodiments of the present application may be directly performed by a hardware decoding processor or the combination of a hardware and a software module in the decoding processor. The software module may be located in a random access memory, a flash memory, a read-only memory, a programmable read-only memory, or an electrically erasable programmable memory, a register, or other mature storage medium in the field. The storage medium is located in a memory, and the processor reads information in the memory and completes the operations of the above methods in combination with the hardware.

It should be understood that the memory in some embodiments of the present disclosure may be a transitory memory and/or a non-transitory memory. The non-transitory memory may be a Read-Only Memory (ROM), a Programmable ROM (PROM), an Erasable PROM (EPROM), an Electrically erasable EPROM (EEPROM) or a flash memory. The transitory memory may be a Random Access Memory (RAM), which is configured as an external cache. By a way of illustration but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchrolink DRAM (SLDRAM), and a Direct Rambus RAM (DR RAM). It should be noted that the memory of the systems and methods described herein is intended to include, but not limited to, these and any other suitable types of memory.

It should be understood that the above memory is an example but not a limiting description. For example, the memory in the embodiments of the present disclosure may also be a SRAM, a DRAM, a SDRAM, a DDR SDRAM, an ESDRAM, a SLDRAM, or a DR RAM. That is, the memory in the embodiments of the present disclosure is intended to include, but not limited to, these and any other suitable types of memory.

Some embodiments of the present disclosure also provide a computer-readable storage medium configured to store a computer program.

In some embodiments, the computer-readable storage medium may be applied to the network device or the base station in the embodiment of the present disclosure, and the computer program enables the computer to execute the corresponding operations implemented by the network device or the base station in the all methods in the embodiments of the present disclosure. For simplicity, the corresponding operations are not repeat here.

In some embodiments, the computer-readable storage medium may be applied to the mobile terminal/terminal device in the embodiments of the present disclosure, and the computer program enables the computer to execute the corresponding operations implemented by the mobile terminal/terminal device in the all methods in the embodiments of the present disclosure. For simplicity, the corresponding operations are not repeat here.

Some embodiments of the present disclosure also provide a computer program product including a computer program instruction.

In some embodiments, the computer program product may be applied to the network device or the base station in the embodiment of the present disclosure, and the computer program instruction enables a computer to execute the corresponding operations implemented by the network device or the base station in all methods in the embodiments of the present disclosure. For simplicity, the corresponding operations are not repeat here.

In some embodiments, the computer program product may be applied to the mobile terminal/terminal device in the embodiment of the present disclosure, and the computer program instruction enables the computer to execute the corresponding operations implemented by the mobile terminal/terminal device in all methods in the embodiment of the present disclosure. For simplicity, the corresponding operations are not repeat here.

Some embodiments of the present disclosure also provide a computer program.

In some embodiments, the computer program may be applied to the network device or base station in the embodiment of the present disclosure. When the computer program runs on a computer, it enables the computer to execute the corresponding operations implemented by the network device or base station in all method in the embodiments of the present disclosure. For simplicity, the corresponding operations are not repeat here.

In some embodiments, the computer program may be applied to the mobile terminal/terminal device in the embodiment of the present disclosure. When the computer program runs on the computer, the computer may execute the corresponding operations implemented by the mobile terminal/terminal device in all methods in the embodiments of the present disclosure. For simplicity, the corresponding operations are not repeat here.

Those skilled in the art may realize that the units and algorithm operations of each example described in combination with some embodiments described herein may be implemented by an electronic hardware, or a combination of a computer software and an electronic hardware. Whether these functions are implemented in a hardware or a software depends on a specific application and a design constraints of the technical solutions. A professional and technical personnel may use different methods for each specific application to implement the described functions, but such implementation should not be considered beyond the scope of the present disclosure.

Those skilled in the art may clearly understand that for the convenience and conciseness of the description, the specific working process of the systems, apparatuses and units described above may refer to the corresponding operations in the above method embodiments, and are not repeated here.

In several embodiments provided herein, it should be understood that the disclosed systems, apparatuses, and methods may be implemented in other ways. For example, the device embodiments described above are merely illustrative. For example, the division of the above units is only a logical function division. In actual implementation, there may be another division manner. For example, multiple units or components may be combined or integrated into another system, or some features can be ignored or not executed. In addition, the mutual coupling or direct coupling or communication connection shown or discussed may be an indirect coupling or communication connection through some interfaces, devices or units, and may be electrical or in other forms.

The units described above as separate components may or may not be physically separated, and the components illustrated as units may or may not be physical units. The units may be located in one place, or may be distributed to multiple network units. Some or all of the units may be selected according to actual needs to achieve the purpose of a solution of the embodiments.

In addition, each functional unit in each embodiment of the present disclosure may be integrated into one processing unit, or each unit may exist physically separately. Optionally, two or more units may also be integrated into one unit.

The above-described integrated unit may be stored in a computer-readable memory if the integrated unit is implemented in the form of a software functional module and sold or used as a standalone product. Based on such understanding, the technical solution of the present disclosure, in essence or the contribution to the prior art, or all or part of the technical solution may be embodied in the form of a software product. The software product may be stored in a memory. The software product may include a number of instructions causing a computer device (the computer device may be a personal computer, a server or a network device, and the like) to perform all or parts of the operations of the above-described methods of various embodiments of the present disclosure. The foregoing memory may include various media which are able to store program codes. The media may include a U disk, a Read-Only Memory (ROM), a Random Access Memory (RAM), a removable hard disk, a magnetic disk, an optical disk, and the like.

The above description is only some embodiments of the present disclosure, but the protection scope of the present disclosure is not limited to this. Changes or replacements that are easily thought of by those skilled in the art should be covered in the protection scope of the present disclosure. Therefore, the protection scope of the present disclosure shall be subject to the protection scope of the claims.

What is claimed is:

1. A wireless communication method, comprising:

receiving, by a terminal device, a first signal for power harvesting; and monitoring, by the terminal device, a second signal, the second signal being configured to schedule or trigger the terminal device for data transmission, and the second signal being transmitted at a plurality of transmission occasions, wherein monitoring, by the terminal device, the second signal comprises;

monitoring, by the terminal device, the second signal, in response to a power of the terminal device being greater than or equal to a preset power.

2. The method as claimed in claim 1, wherein the second signal is transmitted periodically.

3. The method as claimed in claim 2, wherein a transmission period of the second signal is fixed or selected from a plurality of periods;

the transmission period of the second signal is randomly selected from the plurality of periods or selected from the plurality of periods according to a first preset rule.

4. The method as claimed in claim 2, wherein the second signal has a same or different transmission period for the terminal device and other terminal devices that have different at least one of a location, a processed service type, and a terminal type.

5. The method as claimed in claim 1, wherein the second signal is transmitted in a plurality of transmission periods that are switched.

6. The method as claimed in claim 5, wherein each transmission period of the second signal is fixed or selected from a plurality of periods;

the each transmission period of the second signal is randomly selected from the plurality of periods or selected from the plurality of periods according to a second preset rule;

the second preset rule is any one of:

a rule of cyclic selection in a descending order of the transmission periods of the second signal; and a rule of cyclic selection in an ascending order of the transmission periods of the second signal.

7. The method as claimed in claim 5, wherein the transmission periods of the second signal are switched every a first preset time interval;

the first preset time interval is fixed or selected from a plurality of time intervals;

the first preset time interval is randomly selected from the plurality of time intervals or selected from the plurality of time intervals according to a third preset rule.

8. The method as claimed in claim 1, wherein the second signal is transmitted in a particular pattern;

the particular pattern is configured to determine different transmission occasions of the second signal;

a time interval between each adjacent two transmission occasions in the particular pattern is different partly;

the time interval between the each adjacent two transmission occasions varies over time periodically, to be smaller, or to be larger.

9. The method as claimed in claim 8, wherein the particular pattern is fixed or selected from a plurality of patterns;

the particular pattern is randomly selected from the plurality of patterns or selected from the plurality of patterns according to a fourth preset rule.

10. The method as claimed in claim 1, wherein the second signal is transmitted in different particular patterns.

11. The method as claimed in claim 10, wherein each particular pattern is configured to determine different transmission occasions of the second signal;

for the each particular pattern, a time interval between each adjacent two transmission occasions in the each particular pattern is different partly;

the time interval between the each adjacent two transmission occasions varies over time periodically, to be smaller, or to be larger.

12. The method as claimed claim 10, wherein the each particular pattern of the second signal is fixed or selected from a plurality of patterns;

the each particular pattern of the second signal is randomly selected from the plurality of patterns or selected from the plurality of patterns according to a fifth preset rule.

13. The method as claimed in claim 10, wherein the particular patterns of the second signal are switched every a same second preset time interval; or the particular patterns of the second signal are switched every one respective second preset time interval of different second preset time intervals.

14. The method as claimed in claim 13, wherein, for any particular pattern of the second signal, the one respective second preset time interval corresponding to the any particular pattern is greater than or equal to a duration of the any particular pattern;

a duration within the second preset time interval corresponding to the any particular pattern, in addition to the duration of the any particular pattern, is configured to repeat part of all of the any particular pattern, in response to the second preset time interval being greater than the duration of the any particular pattern.

15. The method as claimed in claim 13, wherein the same second preset time interval or the one respective second preset time interval is fixed or selected from a plurality of time intervals;

the same second preset time interval or the one respective second preset time interval is randomly selected from the plurality of time intervals or selected from the plurality of time intervals according to a sixth preset rule.

16. The method as claimed in claim 1, wherein the second signal is transmitted in a third preset time interval with respect to the first signal;

the third preset time interval is greater than or equal to 0;

the third preset time interval is fixed or selected from a plurality of preset time intervals;

the third preset time interval is randomly selected from the plurality of preset time intervals or selected from the plurality of preset time intervals according to a seventh preset rule;

the second signal has a same or different third preset time interval for the terminal device and other terminal devices that have different at least one of a location, a processed service type and a terminal type.

17. The method as claimed in claim 1, further comprising:

performing, by the terminal device, data transmission in back scattering after K time units, in response to the second signal being monitored; wherein K is a positive integer.

18. A wireless communication method, comprising:

transmitting, by a communication device, a second signal at a plurality of transmission occasions, the second signal being configured to schedule or trigger a terminal device to perform data transmission, wherein the second signal is monitored by the terminal device in response to a power of the terminal device being greater than or equal to a preset power.

19. The method as claimed in claim 18, further comprising:

transmitting, by the communication device, a first signal to the terminal device, the first signal being configured to supply power for the terminal device.

20. A terminal device, comprising: a processor and a memory; wherein the memory is configured to store a computer program, the processor is configured to call and run the computer program stored in the memory and perform operations comprising:

receiving a first signal for power harvesting; and monitoring a second signal, the second signal being configured to schedule or trigger the terminal device for data transmission, and the second signal being transmitted at a plurality of transmission occasions wherein monitoring the second signal comprises;

monitoring the second signal in response to a power of the terminal device being greater than or equal to a preset power.

* * * * *